US012451907B2

(12) United States Patent
Shin et al.

(10) Patent No.: US 12,451,907 B2
(45) Date of Patent: Oct. 21, 2025

(54) ANTENNA AND ELECTRONIC DEVICE HAVING SAME

(71) Applicant: SAMSUNG ELECTRONICS CO., LTD., Suwon-si (KR)

(72) Inventors: Dongryul Shin, Suwon-si (KR); Seho Kim, Suwon-si (KR); Gyubok Park, Suwon-si (KR); Jeongwan Park, Suwon-si (KR); Joonbo Park, Suwon-si (KR); Jinkyu Bang, Suwon-si (KR); Min Sakong, Suwon-si (KR); Moonsoo Son, Suwon-si (KR); Kwanseok Lee, Suwon-si (KR); Byungman Lim, Suwon-si (KR); Sooyoung Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 621 days.

(21) Appl. No.: 17/885,127

(22) Filed: Aug. 10, 2022

(65) Prior Publication Data

US 2022/0385311 A1    Dec. 1, 2022

Related U.S. Application Data

(63) Continuation of application No. PCT/KR2021/001739, filed on Feb. 9, 2021.

(30) Foreign Application Priority Data

Feb. 10, 2020    (KR) .................. 10-2020-0015982

(51) Int. Cl.
*H01Q 1/00* (2006.01)
*H01Q 1/24* (2006.01)
(Continued)

(52) U.S. Cl.
CPC ............ *H04B 1/0064* (2013.01); *H01Q 1/243* (2013.01); *H04B 1/40* (2013.01)

(58) Field of Classification Search
CPC .. H01Q 1/00; H01Q 1/22; H01Q 1/24; H01Q 1/241; H01Q 1/242; H01Q 1/243;
(Continued)

(56) References Cited

U.S. PATENT DOCUMENTS 12,034,224 B2 *   7/2024   Shin ................... H01Q 5/364
12,126,095 B2 * 10/2024   Jang .................. H04B 1/3888
(Continued)

FOREIGN PATENT DOCUMENTS

KR    10-2010-0041554 A    4/2010
KR    10-2013-0112895 A    10/2013
(Continued)

OTHER PUBLICATIONS

Office Action issued on May 13, 2024 by the Korean Patent Office in corresponding KR Patent Application No. 10-2020-0015982.
(Continued)

*Primary Examiner* — Hai L Nguyen
(74) *Attorney, Agent, or Firm* — Sughrue Mion, PLLC

(57) ABSTRACT

An electronic device includes a side surface member, a wireless communication circuit, and a switch circuit. The side surface member includes a first conductive portion coupled to the wireless communication circuit and the switch circuit, a second conductive portion coupled to the switch circuit, and a first non-conductive portion disposed between the first conductive portion and the second conductive portion. The switch circuit is controlled to be in at least one of a first state, a second state, and a third state, based on a first frequency of a first operating signal supplied by the wireless communication circuit. The switch circuit is configured to couple the second conductive portion to the (Continued)

wireless communication circuit, in the first state, and to couple the second conductive portion to the first conductive portion, in the second state.

20 Claims, 22 Drawing Sheets

(51) Int. Cl.
*H04B 1/00* (2006.01)
*H04B 1/40* (2015.01)

(58) Field of Classification Search
CPC .. H01Q 1/38; H01Q 1/42; H01Q 1/44; H01Q 21/28; H01Q 5/321; H01Q 5/328; H01Q 5/364; H01Q 5/371
USPC ...................................... 333/17.1, 17.2, 17.3
See application file for complete search history.

(56) References Cited

U.S. PATENT DOCUMENTS

| | | |
|---|---|---|
| 2015/0084817 A1 | 3/2015 | Yong |
| 2015/0145734 A1 | 5/2015 | Caballero et al. |
| 2017/0201013 A1 | 7/2017 | Choi et al. |
| 2018/0248252 A1 | 8/2018 | Hu et al. |
| 2019/0027822 A1 | 1/2019 | Ayala Vazquez et al. |
| 2019/0393586 A1 | 12/2019 | Ayala Vazquez et al. |

FOREIGN PATENT DOCUMENTS

| | | |
|---|---|---|
| KR | 10-2017-0083900 A | 7/2017 |
| KR | 10-2020-0001470 A | 1/2020 |
| KR | 10-2020-0010560 A | 1/2020 |

OTHER PUBLICATIONS

Communication issued Jan. 14, 2025 by the Korean Intellectual Property Office in Korean Patent Application No. 10-2020-0015982.

International Search Report dated May 28, 2021 issued by the International Searching Authority in International Application No. PCT/KR2021/001739 (PCT/ISA/210).

Written Opinion dated May 28, 2021 issued by the International Searching Authority in International Application No. PCT/KR2021/001739 (PCT/ISA/237).

* cited by examiner (A)

(B)

(A)

(B)

ANTENNA AND ELECTRONIC DEVICE HAVING SAME

CROSS-REFERENCE TO RELATED APPLICATIONS

This application is a continuation application of International Application No. PCT/KR2021/001739 filed on Feb. 9, 2021, which claims priority to Korean Patent Application 10-2020-0015982, filed on Feb. 10, 2020, in the Korean Intellectual Property Office, the disclosures of which are incorporated by reference herein in their entireties.

BACKGROUND

1. Field

The disclosure relates to an antenna for communication and an electronic device having an antenna.

2. Description of Related Art

Electronic devices having communication functions have become compact and lightweight, but may include multiple antennas such that mobile communication services in different frequency bands can be provided by using a single electronic device. An electronic device may use a metal mechanical element of the electronic device as a radiator, or may use a metal housing as an antenna radiator.

In addition, electronic devices have become compact, but there has been gradual expansion of displays for visually providing users with information, thereby increasing the proportion occupied by displays among electronic devices.

The region in which a display is disposed on an electronic device may affect antennas. Therefore, it may become difficult to secure a radiation space for securing antenna performance as the display disposed on the electronic device occupies a large area. In addition, in order to support communication technologies in various frequency bands, an electronic device may include multiple antennas. If an electronic device having a limited space includes multiple antennas, interference between the multiple antennas may degrade performance. In addition, the electronic device may have an insufficient space to dispose an antenna for supporting a designated frequency band.

SUMMARY

Provided are an antenna and an electronic device having the same, wherein conductors segmented according to frequency bands are short-circuited through a switch circuit such that antenna performance can be secured within a limited space.

According to an aspect of the disclosure, an electronic device includes: a housing including a side surface member; a wireless communication circuit disposed inside the housing; and a first switch circuit, wherein the side surface member includes: a first conductive portion coupled to the wireless communication circuit and the first switch circuit; a second conductive portion coupled to the first switch circuit; and a first non-conductive portion disposed between the first conductive portion and the second conductive portion, wherein the first switch circuit is configured to be controlled to be in at least one of a first state, a second state, and a third state, based on a first frequency of a first operating signal supplied by the wireless communication circuit, wherein, in the first state, the first switch circuit is configured to couple the second conductive portion to the wireless communication circuit, wherein, in the second state, the first switch circuit is configured to couple the second conductive portion to the first conductive portion, and wherein the third state is an open state.

The first switch circuit includes: a first port that is coupled to the second conductive portion; a second port that is coupled to the first conductive portion; and a third port that is coupled to a second feeding part configured to feed power to the second conductive portion, wherein, in the first state, the first switch circuit is configured to couple the first port to the second port, wherein, in the second state, the first switch circuit is configured to couple the first port to the third port, and wherein, in the third state, the first switch circuit is configured to uncouple the first port, the second port, and the third port.

The electronic device may further include a processor configured to control the first switch circuit, wherein the processor or the wireless communication circuit is configured to: control the first switch circuit to couple the first port to the third port, when the first frequency of the first operating signal supplied from a first feeding part to the first conductive portion is less than a threshold frequency, and control the first switch circuit to couple the first port to the second port, when the first frequency of the first operating signal is greater than or equal to the threshold frequency.

The first switch circuit may further include a fourth port that is coupled to a matching circuit, and the first switch circuit is further to be controlled to be in a fourth state in which the first port is coupled to the fourth port.

The processor or the wireless communication circuit may be further configured to: control the first switch circuit to couple the first port to the third port, when the first frequency of the first operating signal fed is less than the threshold frequency and a second operating signal is fed from the second feeding part; control the first switch circuit to couple the first port to the second port, when the first frequency of the first operating signal fed is greater than or equal to the threshold frequency; and control the first switch circuit to couple the first port to the fourth port, when the first frequency of the first operating signal fed is less than the threshold frequency and a signal is not fed from the second feeding part.

The wireless communication circuit may be configured to: provide the first operating signal in a low frequency band through a first feeding part configured to feed power to the first conductive portion, and provide a second operating signal in at least one of a middle frequency band and a high frequency band through the second feeding part.

The electronic device may further include a feeding point configured to feed power to the first conductive portion through a first feeding part, wherein the feeding point is coupled to the first conductive portion at a position where a first distance between the position and a first end of the first conductive portion adjacent to the first non-conductive portion is shorter than a second distance between the position and an opposite end of the first conductive portion.

The side surface member may further include a short surface and a long surface, and the first conductive portion is disposed in a direction of the short surface, and the second conductive portion is disposed in a direction of the long surface.

The electronic device may further include a second switch circuit configured to connect the first conductive portion to at least one of a matching circuit and a capacitance element.

The electronic device may further include: a third conductive portion configured as a part of the housing or configured as at least a part inside the housing, and electrically spaced apart from the second conductive portion by a second non-conductive portion; and a third switch circuit connected to the second conductive portion and the third conductive portion.

The first switch circuit may include a first port, a second port, and a third port, the first port is connected to the second conductive portion, the second port is connected to the first conductive portion, and the third port is connected to a second feeding part configured to feed power to the second conductive portion, the third switch circuit may include a sixth port and a seventh port, and a fifth port connected to at least one of the sixth port and the seventh port, the fifth port is connected to the second conductive portion, the sixth port is connected to the third conductive portion, and the seventh port is connected to the capacitance element.

The electronic device may further include a processor and a first feeding part configured to feed power to the first conductive portion, and the processor or the wireless communication circuit is configured to: control the first switch circuit to couple the first port to the third port; control the second switch circuit to couple the first conductive portion to the matching circuit; and control the first feeding part to feed the power and the second feeding part to feed the power, when the third switch circuit is controlled to couple the fifth port to the sixth port and to the seventh port.

The electronic device may further include a processor and a first feeding part configured to feed power to the first conductive portion, and the processor or the wireless communication circuit is configured to: control the first switch circuit to couple the first port to the second port; and control the first feeding part to feed the power, when the second switch circuit is controlled to couple the first conductive portion to the capacitance element.

The first switch circuit may further include an eighth port connected to the matching circuit, and the processor or the wireless communication circuit is configured to: control the first feeding part to feed the power, when the first switch circuit is controlled to further couple the first port to the eighth port.

The electronic device may further include a processor and the second feeding part, and the processor or the wireless communication circuit is configured to: control the first switch circuit to couple the first port to the third port; control the second switch circuit to couple the first conductive portion to the capacitance element; and control the second feeding part to feed the power to the second conductive portion, when the third switch circuit is controlled to open the fifth port.

Embodiments disclosed herein provide an antenna and an electronic device including the same, wherein antennas mounted in a small volume are used to ensure a designated radiation efficiency. For example, embodiments disclosed herein may provide an antenna and an electronic device having the same, wherein the antenna has a designated radiation efficiency in a band in which antenna performance is degraded to a large extent by reduction in the volume in which the antenna can be disposed.

Embodiments disclosed herein may provide an antenna and an electronic device having the same, wherein the antenna can cover a broad frequency band (e.g., approximately 600 MHz to approximately 1 GHz) while maintaining radiation efficiency in a designated band.

Advantageous effects obtainable from the disclosure are not limited to the above-mentioned advantageous effects, and other advantageous effects not mentioned herein will be clearly understood by those skilled in the art to which the disclosure pertains.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
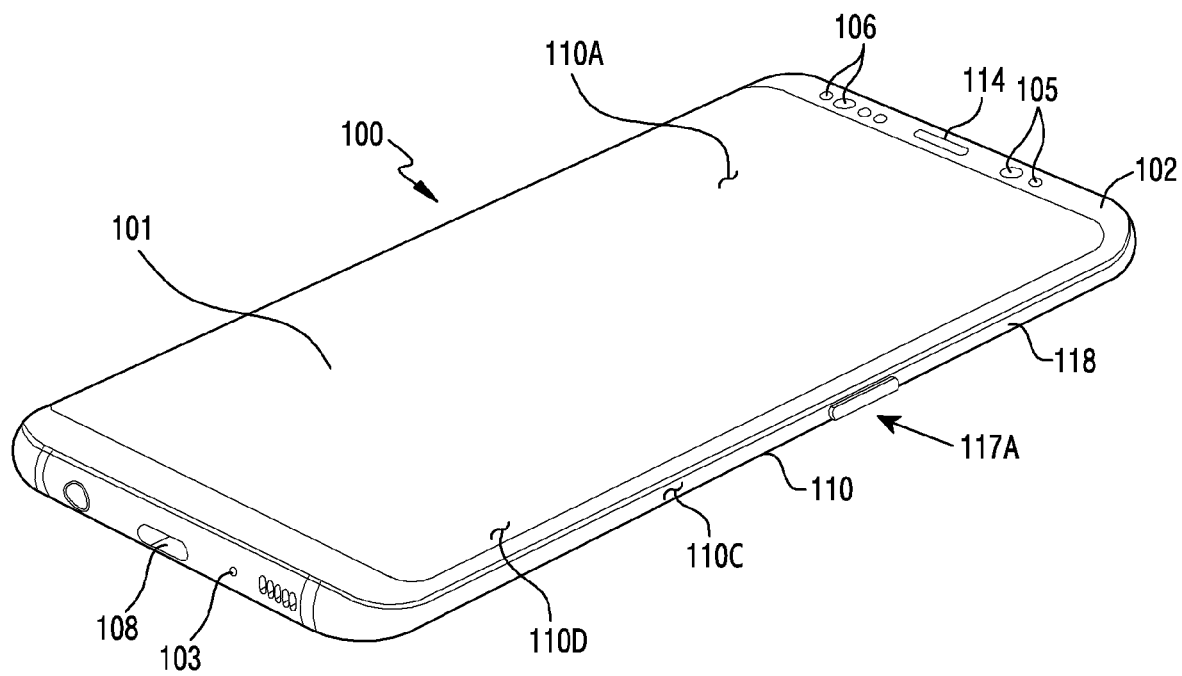
FIG. 1 is a perspective view illustrating an electronic device according to an embodiment.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art will recognize that various changes and modifications of the embodiments described herein can be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

Figure 2:
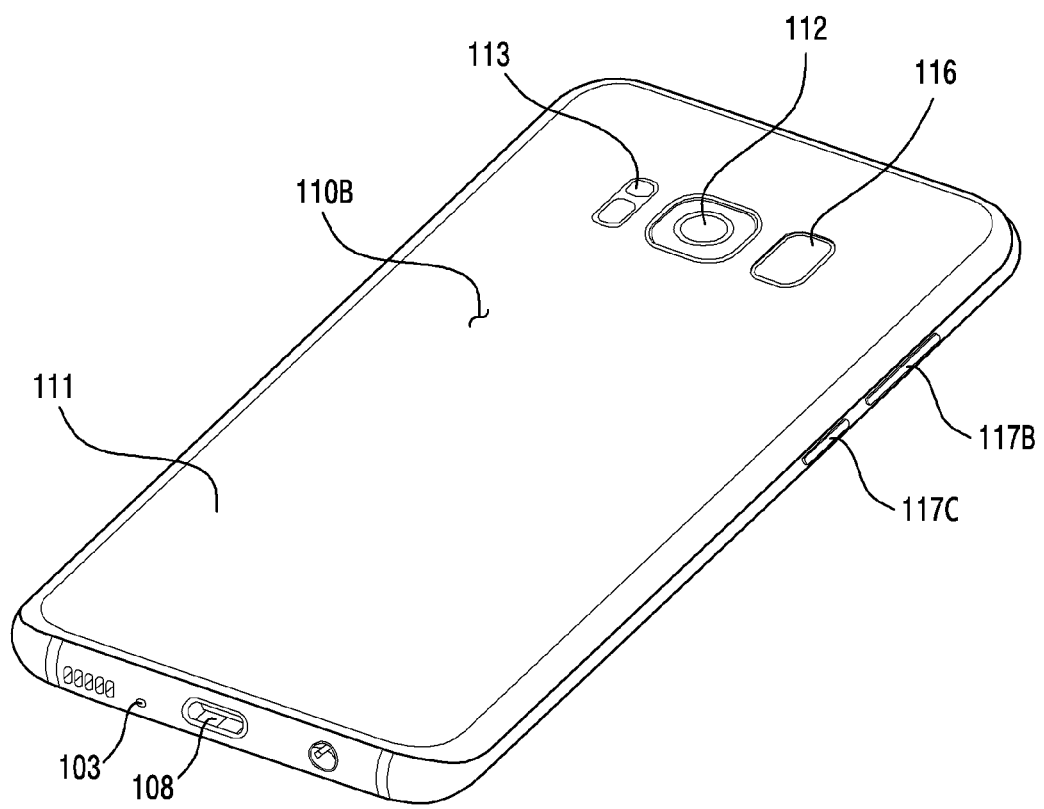
FIG. 2 is a perspective view illustrating the electronic device of FIG. 1 as viewed from the rear side.

FIG. 1 is a perspective view illustrating an electronic device according to one of an embodiment. FIG. 2 is a perspective view illustrating the electronic device of FIG. 1 as viewed from the rear side.

Referring to FIGS. 1 and 2, the electronic device 100, according to an embodiment, may include a housing 110 including a first surface (or a front surface) 110A, a second surface (or a rear surface) 110B, and a side surface 110C surrounding the space between the first surface 110A and the second surface 110B. In another embodiment, the term "housing" may refer to a structure forming at least a portion of the first surface 110A, the second surface 110B, and the side surface 110C of FIG. 2.

According to an embodiment, at least a portion of the first surface 110A may be formed of a substantially transparent front plate 102 (e.g., a glass plate or a polymer plate including various coating layers). According to an embodiment, the front plate 102 may include at least one side edge portion that is an area that is bent from the first surface 110A towards the rear plate 111 and extends seamlessly.

According to various embodiments, the second surface 110B may be formed by a substantially opaque rear plate 111. The rear plate 111 may be formed of, for example, coated or colored glass, ceramic, polymer, or metal (e.g., aluminum, stainless steel (STS), or magnesium), or a combination of two or more materials. According to an embodiment, the rear plate 111 may include at least one side edge portion that includes an area that is bent from the second surface 110B towards the front surface 102 and extends seamlessly.

According to various embodiments, the side surface 110C may be formed by a side bezel structure 118 (e.g., a "side member" or "side wall") coupled (e.g., mechanically coupled and/or connected) to the front plate 102 and the rear plate 111. The side surface 110C may be formed of a metal and/or a polymer. In some embodiments, the rear plate 111 and the side bezel structure 118 may be integrally formed, and may include the same material (e.g., a metal material such as aluminum). In other embodiments, the rear plate 111 and the side bezel structure 118 may include different materials. Embodiments of the present disclosure is not limited in this regard.

According to an embodiment, the electronic device 100 may include at least one of a display 101, a first audio module 103, a second audio module 114, a first camera module 105, one or more key input devices (e.g., 117A, 117B, and 117C, hereinafter "117" generally), and a connector hole 108. In some embodiments, the electronic device 100 may omit at least one component (e.g., key input devices 117). Alternatively or additionally, the electronic device 100 may include other components. For example, the electronic device 100 may include a sensor module In some embodiments, a sensor module, such as a proximity sensor or an illuminance sensor, may be integrated to the display 101 in an area provided by the front plate 102, and/or the sensor module may be disposed adjacent to the display 101.

In some embodiments, the electronic device 100 may further include a light-emitting element. The light-emitting element, for example, may be disposed on a position adjacent to the display 101 in an area provided by the front plate 102. The light-emitting element may provide, for example, information about the state of the electronic device 100 in an optical form. In other embodiments, the light-emitting element may provide a light source that is interlocked with, for example, the operation of the first camera module 105. The light-emitting element may include, for example, a light emitting diode (LED), an infrared (IR) LED, and/or a xenon lamp.

The display 101 may be exposed through a large portion of, for example, the front plate 102. In some embodiments, the edge of the display 101 may be formed to be substantially the same as a shape (e.g., a curved surface) of the periphery of the front plate 102 adjacent thereto. In another embodiment, the distance between the periphery of the display 101 and the periphery of the front plate 102 may be substantially constant in order to enlarge the exposed area of the display 101. In another embodiment (not shown), a recess or an opening may be formed in a portion of the screen display area of the display 101, and another electronic component (e.g., the first camera module 105, a proximity sensor, or an illuminance sensor) aligned with the recess or the opening may be included on a portion of a screen display area of the display 101.

In another embodiment, the rear surface of the screen display area of the display 101 may include at least one of a second camera module 112, a second flash 113, a fingerprint sensor 116, and a first flash 106. In another embodiment, the display 101 may be coupled to or disposed adjacent to a touch-sensitive circuit and/or a digitizer that detects a magnetic-field-type stylus pen. The touch-sensitive circuit may include a pressure sensor that is capable of measuring a touch intensity (e.g., pressure).

The first audio module 103 and the second audio module 114 may include a microphone hole and speaker hole, respectively. The microphone hole may include a microphone disposed therein so as to acquire external sound. In some embodiments, multiple microphones may be disposed therein so as to detect the direction of the external sound. In some embodiments, the speaker hole and microphone hole may be implemented as a single hole, or a speaker may be included without the speaker hole (e.g., a piezo speaker). The speaker hole may include an external speaker hole and a phone call receiver hole 114.

The electronic device 100 may generate, using the sensor module, for example, an electrical signal and/or a data value corresponding to an internal operating state and/or an external environmental state of the electronic device 100. The sensor module, for example, may further include a proximity sensor disposed on the first surface 110A of the housing 110, the fingerprint sensor 116 integrated or disposed adjacent to the display 101, and/or a biometric sensor (e.g., a heart rate monitor (HRM) sensor) disposed on the second surface 110B of the housing 110. The electronic device 100 may further include a sensor module, such as at least one of a gesture sensor, a gyroscopic sensor, an atmospheric pressure sensor, a magnetic sensor, an acceleration sensor, a grip sensor, a color sensor, an IR sensor, a biometric sensor, a temperature sensor, a humidity sensor, and an illuminance sensor.

The first camera module 105 may include a first camera device and/or the first flash 106 disposed on the first surface 110A of the electronic device 100. The second camera module 112 may include a second camera device and/or the second flash 113 disposed on the second surface 110B. The camera devices of the first camera module 105 and/or the second camera module 113 may include one or more lenses, image sensors, and/or image signal processors. The first flash 106, for example, may include an LED and/or xenon lamp. In some embodiments, two or more lenses (e.g., an infrared camera lens, a wide-angle lens, and a telephoto lens) and image sensors may be disposed on one surface of the electronic device 100.

The key input devices 117 may be disposed on the side surface 110C of the housing 110. In another embodiment, the electronic device 100 may not include some or all of the above-mentioned key input devices 177, and another key input device, which is not shown on the electronic device 100, may be implemented in another form, such as that of a soft key or the like, on the display 101). In some embodiments, the key input devices 117 may include at least a portion of the fingerprint sensor 116 disposed on the second surface 110B of the housing 110.

The connector hole 108 may be capable of accommodating a connector for transmitting and/or receiving power and/or data to and/or from an external electronic device, and/or a connector for transmitting and receiving an audio signal to and from the external electronic device. For example, the connector hole 108 may include a USB connector or an earphone jack.

Figure 3:
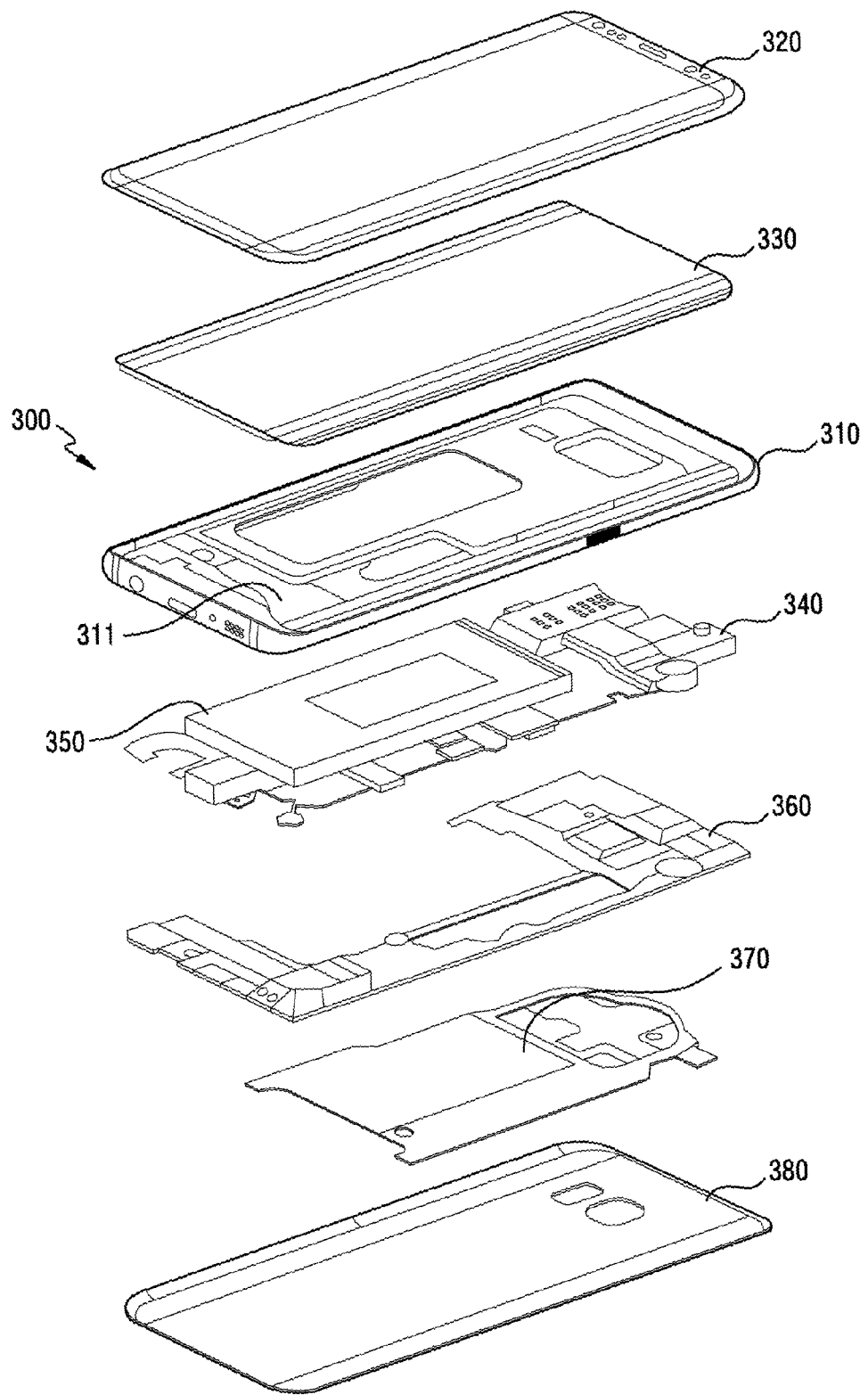
FIG. 3 is an exploded perspective view of the electronic device of FIG. 1.

Referring to FIG. 3, an electronic device 300 may include a side bezel structure 310, a first support member 311 (e.g., a bracket) a font plate 320, a display 330, a printed circuit board 340, a battery 350, a second support member 360 (e.g., a rear case), an antenna 370, and a rear plate 380. In some embodiments, at least one of the components (e.g., the first support member 311 or the second support member 360) may be omitted from the electronic device 300, or the electronic device 300 may additionally include other components. At least one of the components of the electronic device 300 may be the same as or similar to at least one of the components of the electronic device 100 of FIGS. 1 and 2, and a redundant description thereof is omitted below for brevity.

The first support member 311 may be disposed inside the electronic device 300 so as to be connected (e.g., mechanically coupled) to the side bezel structure 310, or the first support member 311 may be integrally formed with the side bezel structure 310. The first support member 311 may be formed of, for example, a metal material and/or a non-metal material (e.g., a polymer). The display 330 may be coupled to one face of the first support member 311, and the printed circuit board 340 may be coupled to the other face of the first support member 311. On the printed circuit board 340, a processor, memory, and/or an interface may be mounted. The processor may include at least one of, for example, a central processing unit (CPU), an application processor, a graphics processor, an image signal processor, a sensor hub processor, and a communication processor.

The memory may include, for example, volatile memory or nonvolatile memory.

The interface may include, for example, a high-definition multimedia interface (HDMI), a universal serial bus (USB) interface, a secure digital (SD) card interface, and/or an audio interface. The interface may electrically and/or physically connect, for example, the electronic device 300 to an external electronic device, and may include a USB connector, an SD card, a MultiMediaCard (MMC) connector, or an audio connector.

The battery 350 is a device for supplying power to at least one component of the electronic device 300, and may include, for example, a non-rechargeable primary battery, a rechargeable secondary battery, or a fuel cell. At least a portion of the battery 350 may be disposed on substantially the same plane as, for example, the printed circuit board 340. The battery 350 may be integrally disposed within the electronic device 300, or may be detachably mounted on the electronic device 300.

The antenna 370 may be disposed between the rear plate 380 and the battery 350. The antenna 370 may include, for example, a nearfield communication (NFC) antenna, a wireless charging antenna, and/or a magnetic secure transmission (MST) antenna. The antenna 370 may perform short-range communication with, for example, an external electronic device, and/or may transmit/receive power required for charging to/from the external device in a wireless manner. In another embodiment, an antenna structure may be formed by the side bezel structure 310, a portion of the first support member 311, or a combination thereof.

Figure 4:
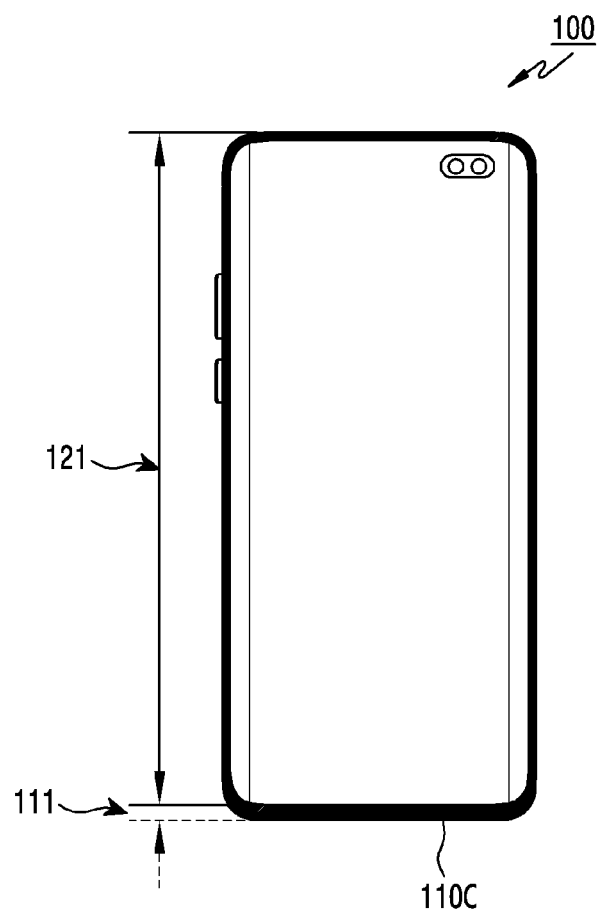
FIG. 4 illustrates an example of a shape of a front surface of an electronic device.
Figure 22:
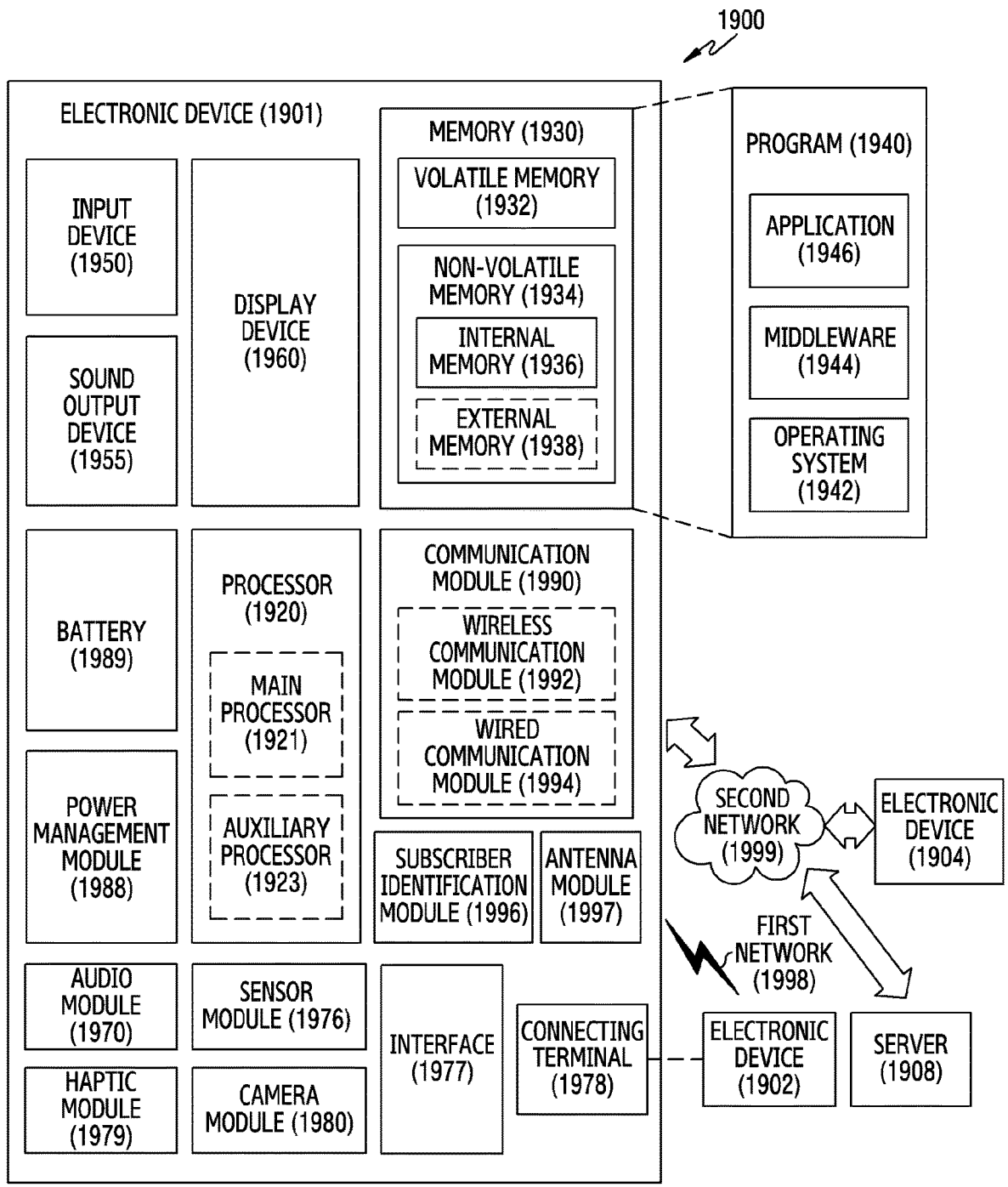
FIG. 22 is a block diagram of an electronic device in a network environment, according to an embodiment.

FIG. 4 illustrates an example of a shape of a front surface of an electronic device 100 (e.g., the electronic device 100 of FIGS. 1 and 2, the electronic device 300 of FIG. 3, and an electronic device 1901 of FIG. 22).

According to an embodiment, the electronic device 100 may be provided in a miniaturized form for the convenience of carrying, and a display (e.g., the display 101 of FIG. 1 and a display device 1960 of FIG. 22) for providing visual information to a user may be configured to have as large an area as possible. For another example, the electronic device 100 may have, as a side bezel structure (e.g., side bezel structure 118 of FIG. 1, side bezel structure 310 of FIG. 3) including a conductive member, a structure which configures at least a part of a housing 110. When an external structure of the electronic device 100 includes a side bezel structure 118 including a conductive member, a housing 110 formed of a conductive member or a part (e.g., the side surface 110C) of the housing 110 may be used as an antenna radiator.

As shown in FIG. 4, when a display area 121 occupied by the display increases and a bezel portion 111 becomes narrow in the configuration of the electronic device 100, the display may influence a radiation operation of an antenna according to the forming of a ground area. That is, as the area occupied by the display increases, a sufficient space for disposing an antenna may not be secured.

Figure 5:
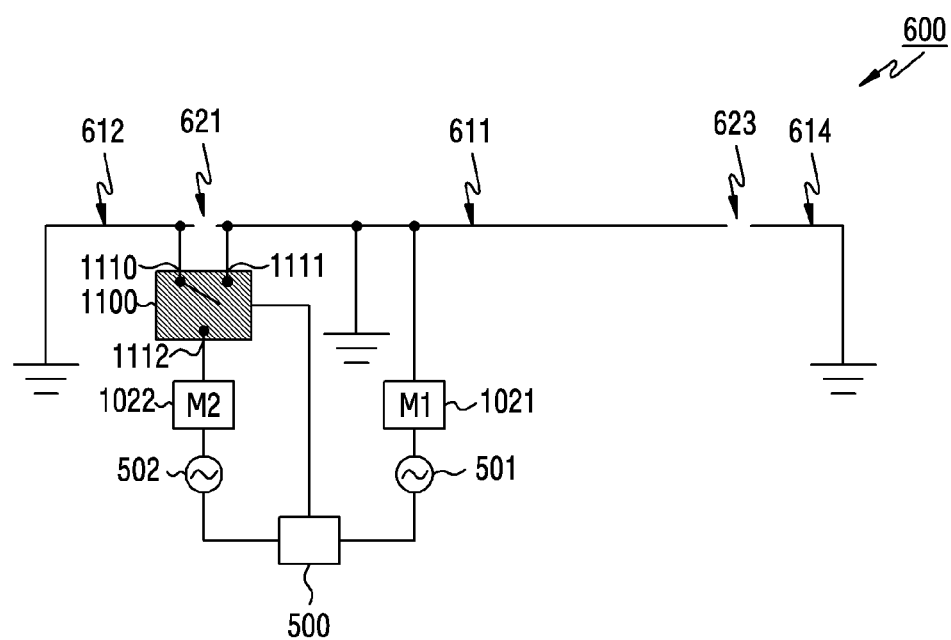
FIG. 5 is a circuit diagram illustrating a circuit structure of an antenna circuit according to an embodiment.

FIG. 5 is a circuit diagram illustrating a circuit structure of an antenna circuit according to an embodiment.

According to various embodiments, an antenna circuit 600 may include a first conductive portion 611 (e.g., a first radiator) and a second conductive portion 612 (e.g., a second radiator). For example, the first conductive portion 611 and the second conductive portion 612 may be pattern antennas disposed inside a housing 110 of an electronic device 100. For another example, the first conductive portion 611 and the second conductive portion 612 may be included in at least a part of the side bezel structure 118 included in the housing 110 of the electronic device 100. In an embodiment, a first non-conductive portion 621 may be disposed between the first conductive portion 611 and the second conductive portion 612. According to an embodiment, the second conductive portion 612 may be disposed adjacent to one end of the first conductive portion 611, and a third conductive portion 614 may be disposed adjacent to the other (e.g., opposite) end of the first conductive portion 611. A second non-conductive portion 623 may be disposed between the first conductive portion 611 and the third conductive portion 614.

According to various embodiments, the antenna circuit may include a first switch circuit 1100 which connects the first conductive portion 611 and the second conductive portion 612, and a wireless communication circuit 500 disposed inside the housing (e.g., the housing 110 of FIG. 1) of the electronic device (e.g., the electronic device 100 of FIGS. 1, 2, and 4, the electronic device 300 of FIG. 3, and the electronic device 1901 of FIG. 22) to transmit and/or receive a wireless frequency signal. The wireless communication circuit 500 may include, for example, a transceiver, but is not limited thereto. In some embodiments, at least some of functions of the wireless communication circuit 500 mentioned herein may be performed by a separate processor. For example, a switch circuit of the antenna circuit may be controlled by a separate communication processor (CP). The wireless communication circuit 500 may transmit and/or receive a wireless frequency signal through at least one of the first conductive portion 611 and the second conductive portion 612.

According to various embodiments, the first conductive portion 611 and the second conductive portion 612 may be connected (e.g., electrically coupled) through the first switch circuit 1100. According to an embodiment, the first switch circuit 1100 may include a first port 1110, a second port 1111, and a third port 1112. The first switch circuit 1100 may be controlled by the wireless communication circuit 500 or a processor (e.g., a processor 1920 of FIG. 22) of the electronic device (e.g., the electronic device 100 of FIGS. 1, 2, and 4, the electronic device 300 of FIG. 3, and the electronic device 1901 of FIG. 22). The processor may include, for example, a communication processor. Throughout the present disclosure, it may be understood that components which may be controlled by the wireless communication circuit 500 may be controlled by the processor of the electronic device 100 in various embodiments.

In some embodiments, according to the control of the wireless communication circuit 500 and/or the processor 1920, the first port 1110 may be connected to at least one of the second port 1111 and the third port 1112 in the first switch circuit 1100. For another example, according to the control of the wireless communication circuit 500 and/or the processor 1920, the first port 1110 may not be connected to the second port 1111 and the third port 1112 in the first switch circuit 1100. For example, the first port 1110 may be a port commonly used at the time of circuit connection using the first switch circuit 1100.

According to various embodiments, in order to transmit a wireless frequency signal through the first conductive portion 611, the first conductive portion 611 may be connected (e.g., electrically coupled) to a feeding circuit 501 which provides a signal to be fed through a first matching part 1021. For example, the first matching part 1021 may include a matching circuit and a feeding point connected to the first conductive portion 611. However, the disclosure is not limited thereto. For example, the first matching part 1021 may be omitted and a first feeding circuit 501 may be connected to the first conductive portion 611. A signal may be transmitted from the feeding circuit 501 to the feeding point through the first matching part 1021. According to an embodiment, the feeding point at which the first matching part 1021 is connected to the first conductive portion 611 may be disposed on the first conductive portion 611 at a position closer to the first non-conductive portion 621 than to the second non-conductive portion 623.

In an embodiment, the first port 1110 may be connected to the second conductive portion 612, the second port 1111 may be connected to a first conductive portion 611, and the third port 1112 may be connected to a second feeding circuit 502 through a second matching part 1022. For example, the second matching part 1022 may include a matching circuit. However, the disclosure is not limited thereto. For example, the second matching part 1022 may be omitted and a second feeding part 502 may be connected to the second conductive portion 612 through the first switch circuit 1100.

Continuing to refer to FIG. 5, the first feeding circuit 501 and the second feeding circuit 502 are illustrated separately from the wireless communication circuit 500 in order to show a structure in which power is fed, but the first feeding circuit 501 and the second feeding circuit 502 may be circuits included in the wireless communication circuit 500. When power is fed to at least one of the first conductive portion 611 and the second conductive portion 612, as shown in FIG. 5, at least one of the first conductive portion 611 and the second conductive portion 612 may function as an antenna radiator. In an embodiment, a feeding circuit may be a feeding part. In an embodiment, the first matching part 1021 or the second matching part 1022 may be omitted.

Figure 6:
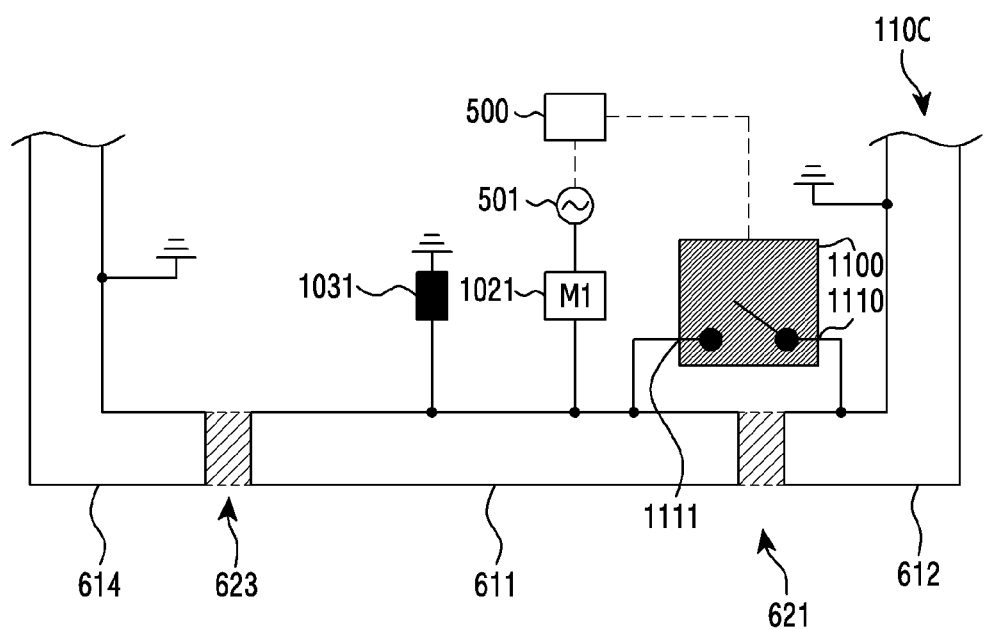
FIG. 6 illustrates structures of antennas included in an electronic device according to an embodiment.

FIG. 6 illustrates a structure of an antenna structure according to an embodiment.

According to an embodiment, an electronic device (e.g., the electronic device 100 of FIGS. 1, 2, and 4, the electronic device 300 of FIG. 3, and the electronic device 1901 of FIG. 22) may include a housing (e.g., the side surface 110C) including the first conductive portion 611 or the second conductive portion 612. In an embodiment, at least a part of the first conductive portion 611 may be used as a first radiator, and at least a part of the second conductive portion 612 may be used as a second radiator. For another example, the electronic device 100 may use a plurality of conductive patterns disposed throughout at least a portion of the inside of the housing 110, as the first radiator and the second radiator. The first non-conductive portion 621 may be disposed between the first conductive portion 611 and the second conductive portion 612. According to an embodiment, the first non-conductive portion 621 may be filled with a dielectric. For another example, the housing 110 of the electronic device 100 may include the third conductive portion 614, and the second non-conductive portion 623 may be disposed between the first conductive portion 611 and the third conductive portion 614.

According to an embodiment, the electronic device 100 may include the first switch circuit 1100. The first switch circuit 1100 may include the first port 1110 and the second port 1111. The first switch circuit 1100 may be controlled by the wireless communication circuit 500 and/or a processor (e.g., the processor 1920 of FIG. 22). For example, the first switch circuit 1100 may connect (e.g., electrically couple) the first port 1110 to the second port 1111 included in the first switch circuit 1100, or open the first port.

According to an embodiment, the electronic device 100 may include the first matching part 1021. The first matching part 1021 may be connected to a matching circuit and a feeding point connected to the first conductive portion 611. Power may be fed from the wireless communication circuit 500 to the first conductive portion 611 through the first matching part 1021. However, the disclosure is not limited thereto. For example, the first matching part 1021 may be omitted and the first feeding circuit 501 may be connected to the first conductive portion 611. In an embodiment, the wireless communication circuit 500 and/or the processor 1920 may control the first switch circuit 1100, based on a frequency of a signal supplied to the first conductive portion 611. For example, when the frequency of the supplied signal is less than a threshold frequency, the first switch circuit 1100 may be opened. Alternatively or additionally, when the frequency of the supplied signal is greater than or equal to the threshold frequency, the first port 1110 and the second port 1111 of the first switch circuit 1100 may be short-circuited.

In an embodiment, the threshold frequency may be a frequency designated as a reference for determining whether to perform an operation of controlling to change a connection state of the first switch circuit 1100 included in the electronic device 100. For example, the threshold frequency may be a frequency designated to correspond to the characteristic of an antenna included in the electronic device 100. In an embodiment, the threshold frequency may be designated as a frequency of a point at which the performance of the antenna, which is changed by the control of the first switch circuit 1100, intersects in a designated frequency band. For example, in the case where communication, based on a signal having a frequency of less than 800 MHz, is performed in a state in which the first conductive portion 611 and the second conductive portion 612 are not connected, the antenna performance may be better than in the case of performing the communication in another state in which the first conductive portion 611 and the second conductive portion 612 are connected. Alternatively or additionally, in the case where communication, based on a signal having a frequency above 800 MHz, is performed in a state in which the first conductive portion 611 and the second conductive portion 612 are connected, the antenna performance may be better than in the case of performing the communication in another state in which the first conductive portion 611 and the second conductive portion 612 are not connected. That is, in such cases, 800 MHz may be designated as the threshold frequency.

According to an embodiment, the electronic device 100 may include a first matching circuit 1031 connected to the first conductive portion 611. For example, the first matching circuit 1031 may be an inductor-capacitor (LC) component (e.g., a low-pass filter) including a lumped element for matching with respect to the first conductive portion 611. For another example, the first matching circuit 1031 may be configured as a switch circuit including a tunable element.

According to an embodiment, the second conductive portion 612 and/or the third conductive portion 614 may be connected to the ground.

Figure 7:
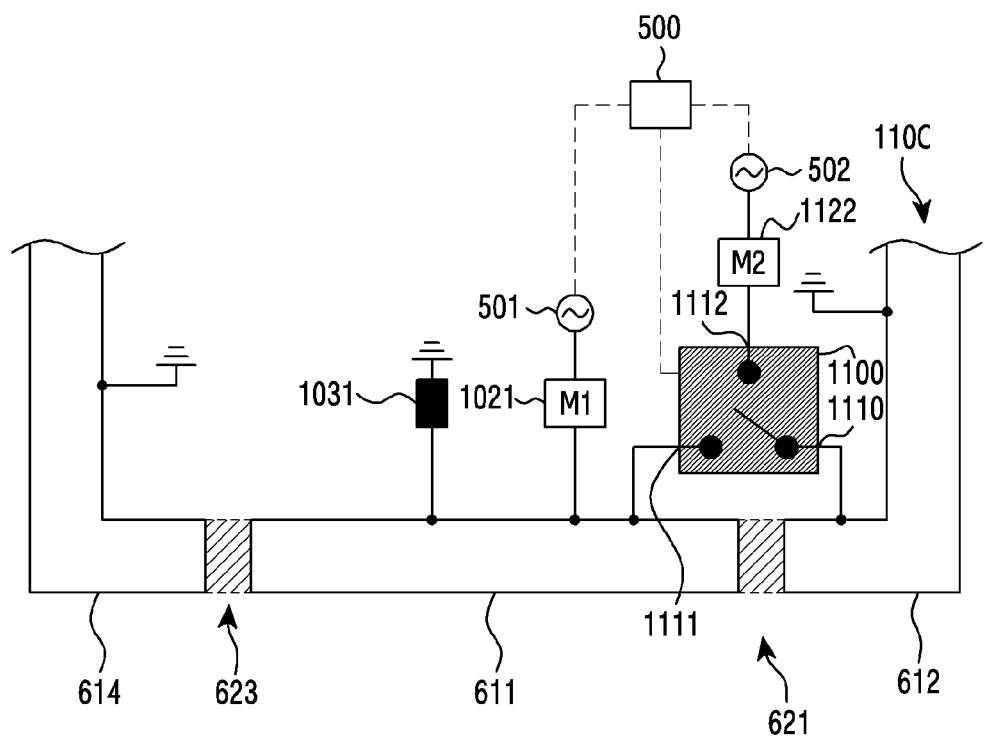
FIG. 7 illustrates structures of antennas included in an electronic device according to an embodiment.

FIG. 7 illustrates structures of antennas included in an electronic device according to another embodiment.

According to an embodiment, an electronic device (e.g., the electronic device 100 of FIGS. 1, 2, and 4, the electronic device 300 of FIG. 3, and the electronic device 1901 of FIG. 22) may use at least a part of the first conductive portion 611 included in a housing (e.g., the side member 110C) as a first radiator, and use at least a part of the second conductive portion 612 as a second radiator. For another example, the electronic device 100 may use a plurality of conductive patterns disposed throughout at least a portion of the inside of the housing 110, as the first radiator and the second radiator. The first non-conductive portion 621 may be disposed between the first conductive portion 611 and the second conductive portion 612. According to an embodiment, the first non-conductive portion 621 may be filled with a dielectric. For another example, the housing 110 of the electronic device 100 may include the third conductive portion 614, and the second non-conductive portion 623 may be disposed between the first conductive portion 611 and the third conductive portion 614.

According to an embodiment, the electronic device 100 may include the first switch circuit 1100. In an embodiment, the first switch circuit 1100 may include the first port 1110, the second port 1111, and the third port 1112. The first switch circuit 1100 may be controlled by the wireless communication circuit 500 or a processor (e.g., the processor 1920 of FIG. 22). For example, the first switch circuit 1100 may connect the first port 1110 to at least one of the second port 1111 and the third port 1112 included in the first switch circuit 1100. For another example, the first switch circuit 1100 may open the first port 1110.

According to an embodiment, the electronic device 100 may include the first matching part 1021 and/or the second matching part 1022. For example, the second matching part 1022 may be connected to the third port 1112 of the first switch circuit 1100. In an embodiment, when the first port 1110 of the first switch circuit 1100 is connected to the third port 1112, power feeding of the second feeding part 502 may be performed to the second conductive portion 612 from the wireless communication circuit 500 through the second matching part 1022. However, the disclosure is not limited thereto. For example, the first matching part 1021 may be omitted and the first feeding circuit 501 may be connected to the first conductive portion 611. For another example, the second matching part 1022 may be omitted and the second feeding circuit 502 may be connected to the second conductive portion 612 through the first switch circuit 1100.

According to an embodiment, a signal in a designated band (e.g., a low band) may be transmitted or received through the first conductive portion 611. For another example, a signal in a band (e.g., a mid-band signal and a high-band signal) different from the designated band may be transmitted or received through the second conductive portion 612.

In the present disclosure, an operation mode in which the electronic device 100 operates in a state in which the first port 1110 and the second port 1111 are connected may be referred to as a first operation mode. When the electronic device 100 operates in the first operation mode, the second conductive portion 612 and the first conductive portion 611 connected to the first feeding circuit 501 may be connected by the first switch circuit 1100. The connected first conductive portion 611 and second conductive portion 612 may operate together as a radiator of a first antenna.

An operation mode in which the electronic device 100 operates in a state in which the first port 1110 and the third port 1112 are connected may be referred to as a second operation mode. When the electronic device 100 operates in the second operation mode, the first conductive portion 611 connected to the first feeding circuit 501 may operate as the radiator of the first antenna. When the electronic device 100 operates in the second operation mode, the second conductive portion 612 connected to the second feeding circuit 502 may operate as a radiator of a second antenna.

According to an embodiment, the wireless communication circuit 500 and/or the processor 1920 may control the first switch circuit 1100, based on a frequency of a signal supplied to the first conductive portion 611. For example, when the frequency of the supplied signal is less than a threshold frequency, the wireless communication circuit 500 may short-circuit the first port 1110 and the third port 1112 of the first switch circuit 1100, and when the frequency is greater than or equal to the threshold frequency, the wireless communication circuit 500 may short-circuit the first port 1110 and the second port 1111 of the first switch circuit 1100. For another example, the wireless communication circuit 500 may open the first port 1110 when the frequency of the supplied signal is less than the threshold frequency, and the power feeding of the second feeding part 502 is not performed through the second matching part 1022.

According to an embodiment, the electronic device 100 may include the first matching circuit 1031 connected to the first conductive portion 611. For example, the first matching circuit 1031 may be a circuit for matching with respect to the first conductive portion 611. For another example, the first matching circuit 1031 may be configured as a switch circuit including a tunable element.

Figure 8:
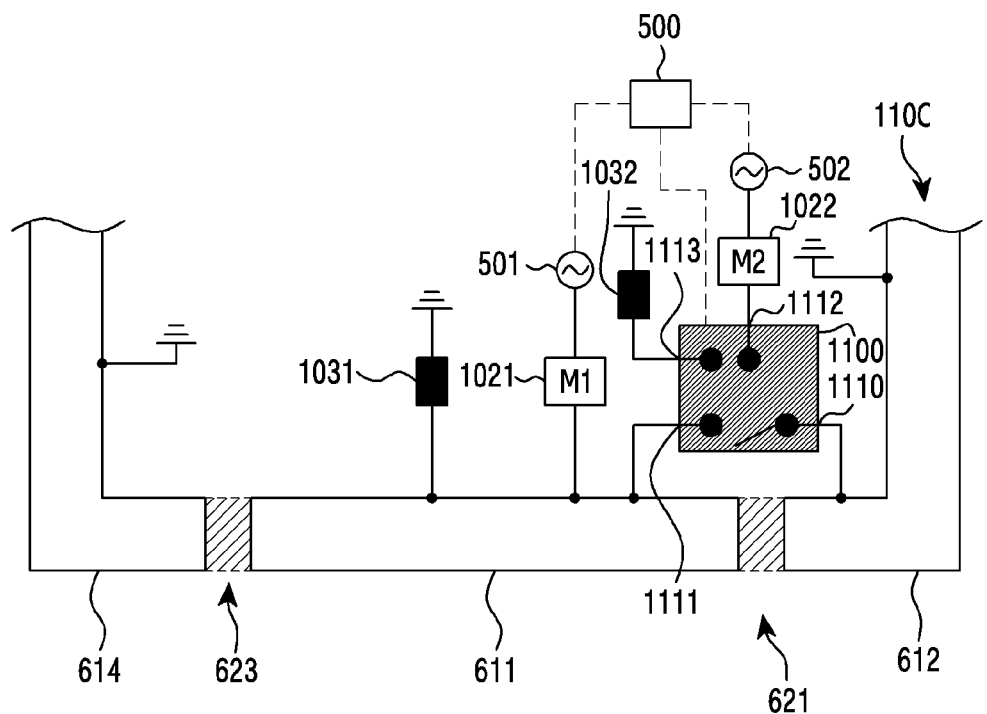
FIG. 8 illustrates structures of antennas included in an electronic device according to an embodiment.

FIG. 8 illustrates structures of antennas included in an electronic device according to an embodiment.

According to an embodiment, an electronic device (e.g., the electronic device 100 of FIGS. 1, 2, and 4, the electronic device 300 of FIG. 3, and the electronic device 1901 of FIG. 22) may use at least a part of the first conductive portion 611 included in a housing (e.g., the side surface 110C) as a first radiator, and use at least a part of the second conductive portion 612 as a second radiator. For another example, the electronic device 100 may use a plurality of conductive patterns disposed throughout at least a portion of the inside of the housing 110, as the first radiator and the second radiator. The first non-conductive portion 621 may be disposed between the first conductive portion 611 and the second conductive portion 612. According to an embodiment, the first non-conductive portion 621 may be filled with a dielectric.

According to an embodiment, the electronic device 100 may include the first switch circuit 1100. In an embodiment, the first switch circuit 1100 or the second matching part 1022 may be disposed on a printed circuit board. For example, when the electronic device 100 includes a first printed circuit board on which the wireless communication circuit 500 is disposed and a second printed circuit board connected to the first printed circuit board through a transmission line (e.g., a flexible PCB, cable), the first switch circuit 1100 may be disposed on the second printed circuit board.

In an embodiment, the first switch circuit 1100 may include the first port 1110, the second port 1111, and the third port 1112. For example, the first switch circuit 1100 may connect the first port 1110 to at least one of other ports included in the first switch circuit 1100. According to an embodiment, the second port 1111 may be connected to the first conductive portion 611, and the first port 1110 may be connected to the second conductive portion 612.

According to an embodiment, the electronic device 100 may include the first matching part 1021 and/or the second matching part 1022. According to an embodiment, the wireless communication circuit 500 of the electronic device 100 may feed signals of different bands through the first matching part 1021 and the second matching part 1022. According to an embodiment, the first matching part 1021 may be connected to the first conductive portion 611. The second matching part 1022 may be connected to the third port 1112 of the first switch circuit 1100. However, the disclosure is not limited thereto. For example, the first matching part 1021 may be omitted and the first feeding circuit 501 may be connected to the first conductive portion 611. For another example, the second matching part 1022 may be omitted and the second feeding circuit 502 may be connected to the second conductive portion 612 through the first switch circuit 1100.

According to an embodiment, the first switch circuit 1100 may further include a fourth port 1113. In an embodiment, the electronic device 100 may include the first matching circuit 1031 connected to the first conductive portion 611. For another example, the electronic device 100 may include a second matching circuit 1032 connected to the fourth port 1113. According to an embodiment, the first matching circuit 1031 may be a circuit for matching with respect to the first conductive portion 611. When the second matching circuit 1032 is connected to the second conductive portion 612 through the first switch circuit 1100, the second matching circuit 1032 may operate as a matching circuit which adjusts a resonance frequency of the second conductive portion 612 acting as a radiator.

According to an embodiment, the electronic device 100 may further include the wireless communication circuit 500 configured to control the first switch circuit 1100. For example, the wireless communication circuit 500 may include at least one processor (e.g., the processor 1920 of FIG. 22) or a communication processor. For another example, the first switch circuit 1100 may be controlled by a processor separate from the wireless communication circuit 500. In an embodiment, the wireless communication circuit 500 may selectively connect the first port 1110 of the first switch circuit 1100 to at least one other port. For another example, the wireless communication circuit 500 may control the first port 1110 of the first switch circuit 1100 to be opened.

According to an embodiment, the communication circuit 500 may feed a signal to at least one of the first conductive portion 611 and the second conductive portion 612 through at least one of the first matching part 1021 and the second matching part 1022. Alternatively, the wireless communication circuit 500 may receive a signal received by the first conductive portion 611 and the second conductive portion 612 through at least one of the first matching part 1021 and the second matching part 1022.

Figure 10:
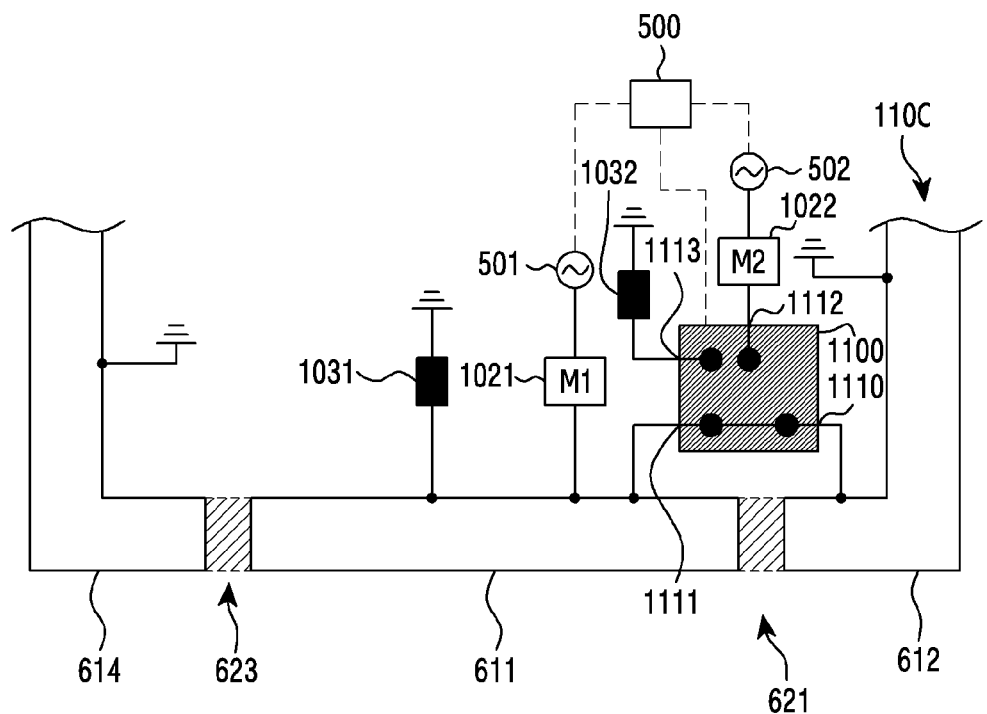
FIG. 10 illustrates another operation state of the antennas shown in FIG. 8 according to an embodiment.

As shown in FIG. 10, when the first non-conductive portion 621 between the first conductive portion 611 and the second conductive portion 612 of the side surface 110C of the housing 110 is short-circuited, compared to the case in which the first conductive portion 611 is separated from the second conductive portion 612, an electrical length may be changed while the first conductive portion 611 and the second conductive portion 612 are connected. The wireless communication circuit 500 of the electronic device (e.g., the electronic device 100 of FIGS. 1, 2, and 4, the electronic device 300, and the electronic device 1901 of FIG. 22) according to an embodiment may feed a signal through a first feeding part 501 in a state in which the first conductive portion 611 and the second conductive portion 612 are short-circuited.

Figure 9:
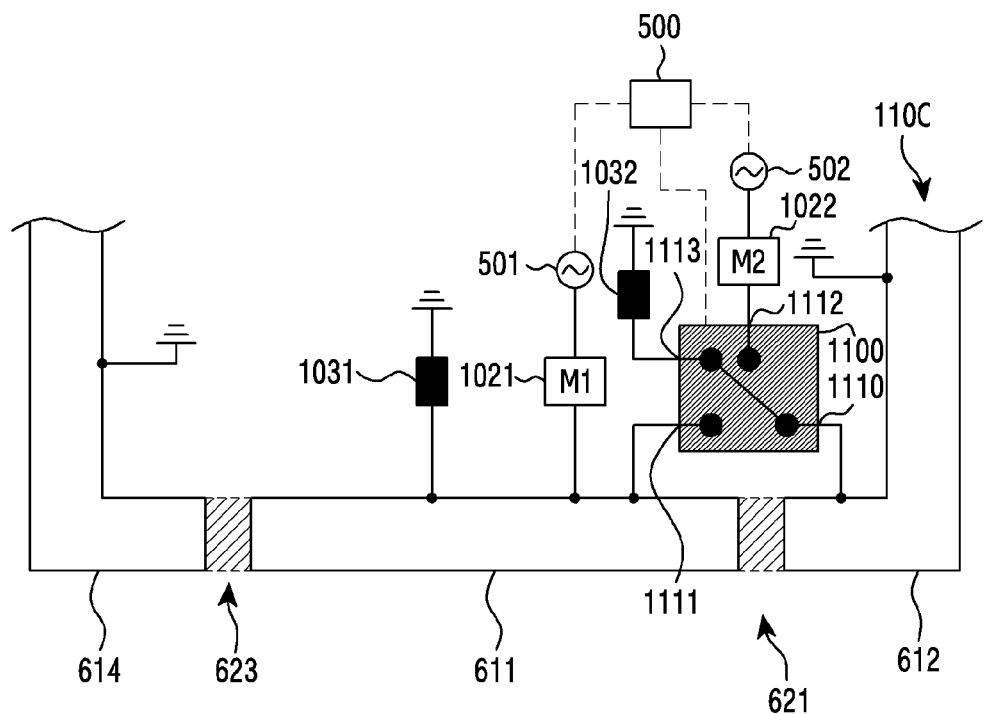
FIG. 9 illustrates an operation state of the antennas shown in FIG. 8 according to an embodiment.

FIG. 9 illustrates an operation state of the antennas shown in FIG. 8 according to an embodiment.

According to an embodiment, the wireless communication circuit 500 of the electronic device 100 may be configured to control the first switch circuit 1100 such that the first port 1110 is connected to the fourth port 1113. Referring to FIG. 9, when the first port 1110 is connected to the fourth port 1113, the first conductive portion 611 may be electrically separated from the second conductive portion 612. The electronic device 100 may transmit a wireless signal from the first feeding part 501 through the first conductive portion 611, or may receive a wireless signal through the first conductive portion 611. According to an embodiment, when an operating frequency of a signal to be used for wireless communication is less than a threshold frequency and the signal is not transmitted through the second feeding part 502, the wireless communication circuit 500 may control the first switch circuit 1100 so as to connect the first port 1110 to the fourth port 1113.

Referring to FIG. 9, in the state in which the first switch circuit 1100 is controlled as shown in FIG. 9, the first conductive portion 611 and the second conductive portion 612 are not connected, and power feeding of the first feeding part 501 is performed to the first conductive portion 611, so that the first conductive portion 611 may operate as a first radiator.

FIG. 10 illustrates another operation state of the antennas shown in FIG. 8 according to an embodiment.

According to an embodiment, the wireless communication circuit 500 of the electronic device 100 may be configured to control the first switch circuit 1111 such that the first port 1110 is connected to the second port 1111. Referring to FIG. 10, when the first port 1110 is connected to the second port 1111, the first conductive portion 611 and the second conductive portion 612 may be short-circuited to each other. Accordingly, a fringing field configured in the first non-conductive portion 621 may be removed.

According to an embodiment, the wireless communication circuit 500 of the electronic device 100 may control the first switch circuit 1100 such that the first port 1110 is connected to the second port 1111 when an operating frequency of a signal to be used for wireless communication is greater than or equal to a threshold frequency. For example, when a frequency of a signal fed to the first conductive portion 611 through the first matching part 1021 is 800 MHz or higher, the first switch circuit 1100 may be controlled such that the first port 1110 is connected to the second port 1111. 800 MHz is only an example for describing an embodiment, and the threshold frequency may be configured differently according to the characteristic (e.g., a length of the first conductive portion 611) of the electronic device 100.

According to an embodiment, when an operating frequency of a signal to be used for wireless communication is greater than or equal to a threshold frequency, the wireless communication circuit 500 of the electronic device 100 may control the first switch circuit 1100 under the control of the wireless communication circuit 500, so as to short-circuit between the first conductive portion 611 and the second conductive portion 612, so that the electronic device 100 can improve radiation efficiency of an antenna when the operating frequency is greater than or equal to the threshold frequency. For example, in the operation state shown in FIG. 10, an antenna may be configured to include the first conductive portion 611, the second conductive portion 612, the first matching circuit 1031, and the first matching part 1021.

Figure 11:
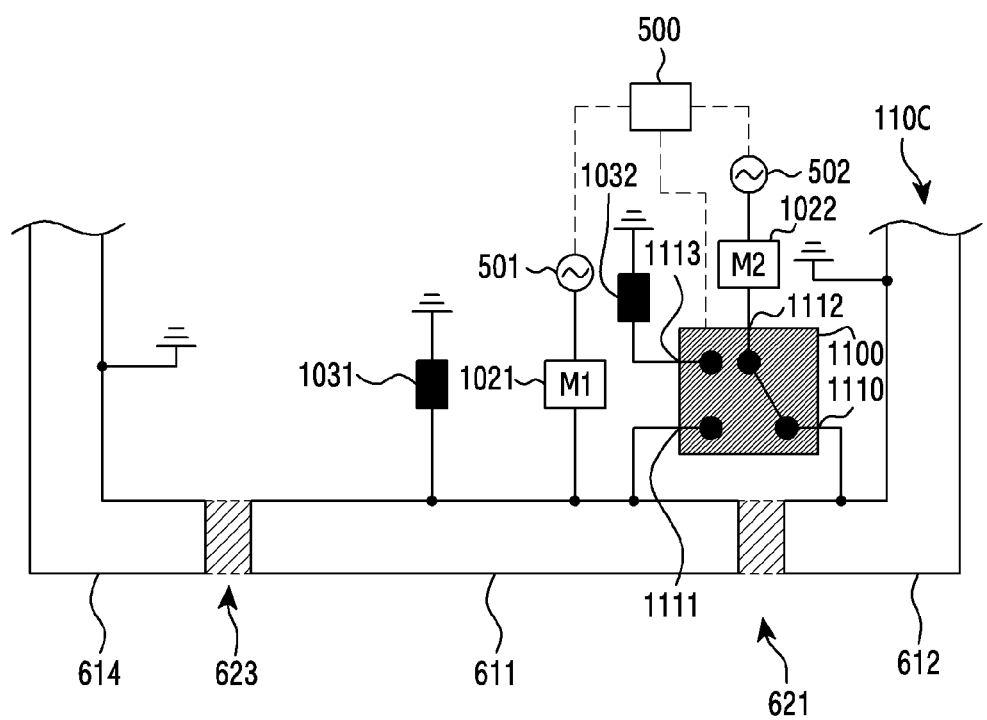
FIG. 11 illustrates yet another operation state of the antennas shown in FIG. 8 according to an embodiment.

FIG. 11 illustrates yet another operation state of the antennas shown in FIG. 8 according to an embodiment.

According to an embodiment, the wireless communication circuit 500 of the electronic device 100 may be configured to control the first switch circuit 1111 such that the first port 1110 is connected to the third port 1112. Referring to FIG. 11, when the first port 1110 is connected to the third port 1112, the first conductive portion 611 may be connected to the first matching part 1021, and the second conductive portion 612 may be connected to the second matching part 1022.

For example, according to the structure shown in FIG. 11, a first antenna is configured to include the first feeding part 501, the first matching circuit 1031, the first conductive portion 611, and/or the first matching part 1021. A second antenna may be configured to include the second feeding part 502, the second matching part 1022, the second conductive portion 612, and/or a ground part connected to the second conductive portion 612.

According to an embodiment, the wireless communication circuit 500 of the electronic device 100 may control the first matching part 1021 and the second matching part 1022 so as to transmit and/or receive wireless signals of different bands through the first conductive portion 611 and the second conductive portion 612, respectively. For example, a wireless signal in a low frequency band may be transmitted or received through the first conductive portion 611, and a wireless signal in a middle band or a high frequency band may be transmitted or received through the second conductive portion 612.

According to an embodiment, in the second non-conductive portion 623 which is a segment part located relatively far on the first conductive portion 611 from a position at which power is fed by the first feeding part 501, a high voltage is excited in a designated band (e.g., a low band (LB)) and thus a fringing electric field (E-field) may be formed, so that a main radiation area may be formed in the second non-conductive portion 623. For another example, in the first non-conductive portion 621 located relatively close on the first conductive portion 611 to a position at which power is fed by the first feeding part 501, a high voltage is excited in a band (e.g., a mid-band (MB) or a high band) different from the designated band and thus a fringing field may formed, so that a main radiation area in a band different from the designated band may be formed in the first non-conductive portion 621.

Figure 12:
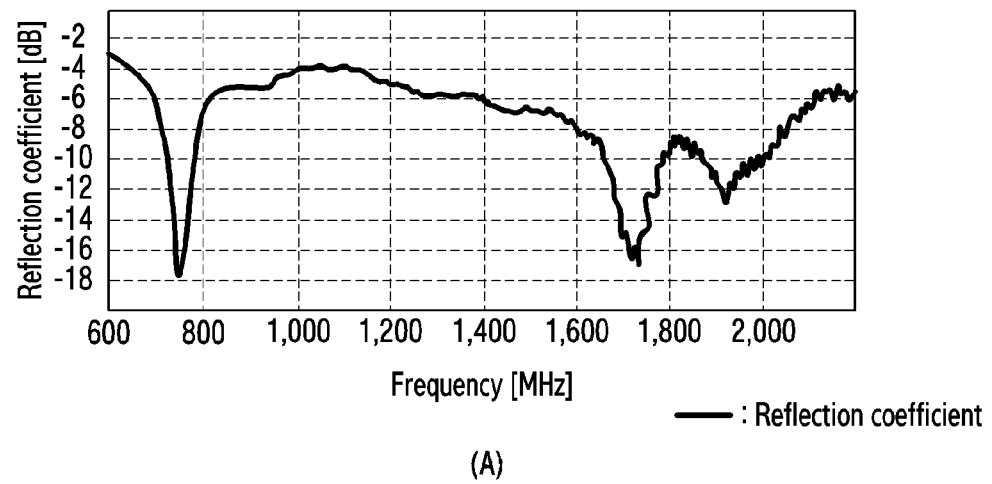
FIG. 12 is a graph showing performance of an antenna operating in the state shown in FIG. 10.
Figure 12:
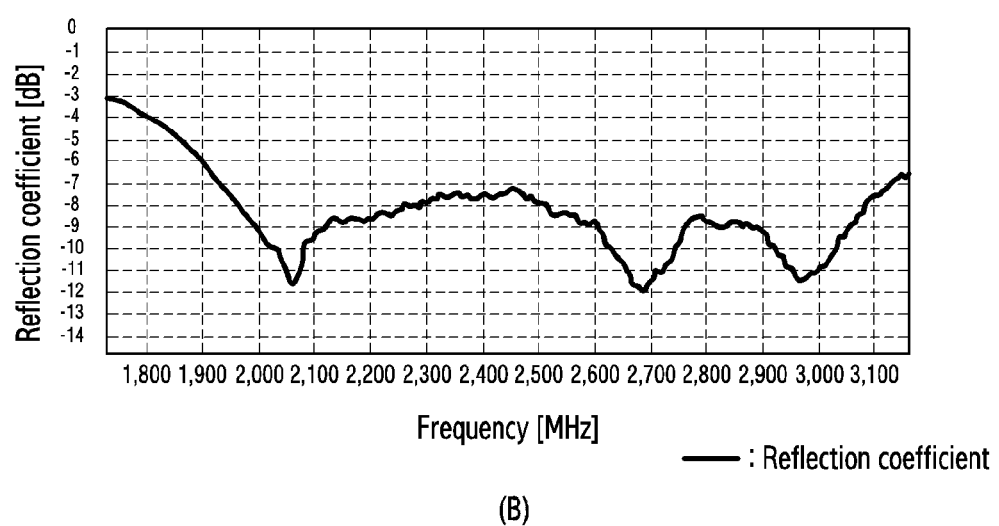

FIG. 12 is a graph showing performance of an antenna operating in the state shown in FIG. 10 as an example. Case (a) of FIG. 12 is a graph showing a reflection coefficient for a signal fed by the first feeding part 501 as an example. Case (b) of FIG. 12 is a graph showing a reflection coefficient for a signal fed by the second feeding part 502 as an example. Referring to FIG. 12, in an antenna using the side member 110C, an operating frequency in a structure in which two portions 621 and 623 in which the conductive portions 611, 612, and 614 are segmented exist may be identified.

Figure 13:
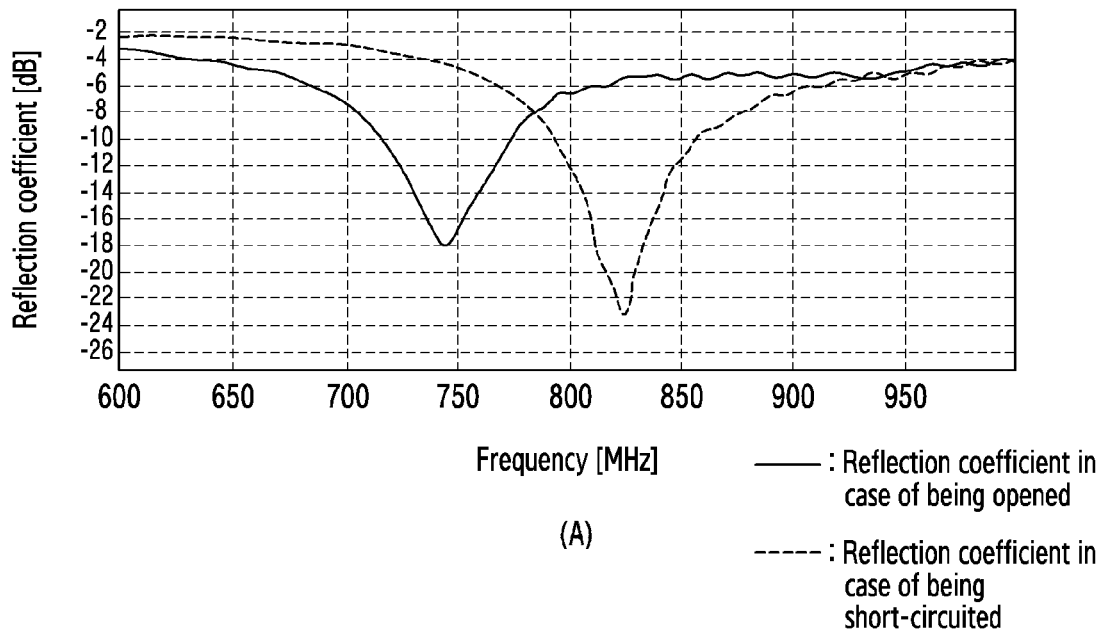
FIG. 13 is a graph showing reflection coefficients in a designated band and a middle band of an antenna operating in the state shown in FIG. 10 and an antenna operating in the state shown in FIG. 11.
Figure 13:
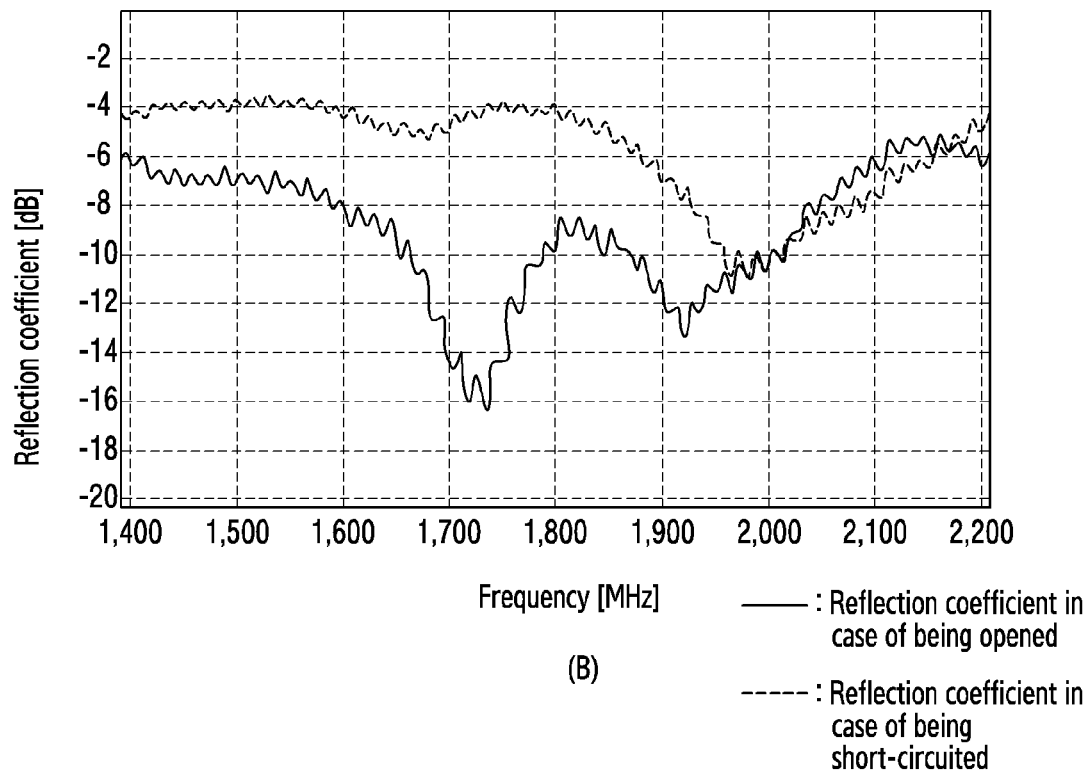

FIG. 13 is a graph showing reflection coefficients in a low band and a middle band of an antenna operating in the state shown in FIG. 10 and an antenna operating in the state shown in FIG. 11 as an example. Particularly, case (a) of FIG. 13 is a graph showing a reflection coefficient of an antenna in a low band as an example. Case (b) of FIG. 13 is a graph showing a reflection coefficient in a middle band.

In cases (a) and (b) of FIG. 13, a reflection coefficient in the case of being opened represents a value measured with respect to the first conductive portion 611. Referring to case (a) of FIG. 13, it may be seen that in the case where the first conductive portion 611 and the second conductive portion 612 are short-circuited, an electrical length is short compared to the case in which the first conductive portion 611 operates as an independent conductive portion. In addition, referring to case (b) of FIG. 13, in the case where the first conductive portion 611 and the second conductive portion 612 are short-circuited, resonance may be formed in a narrow band in the middle band and radiation efficiency may be low. This indicates that the first conductive portion 611 and the second conductive portion 612 are short-circuited, so that a fringing field formed in the first non-conductive portion 621 is removed.

Figure 14:
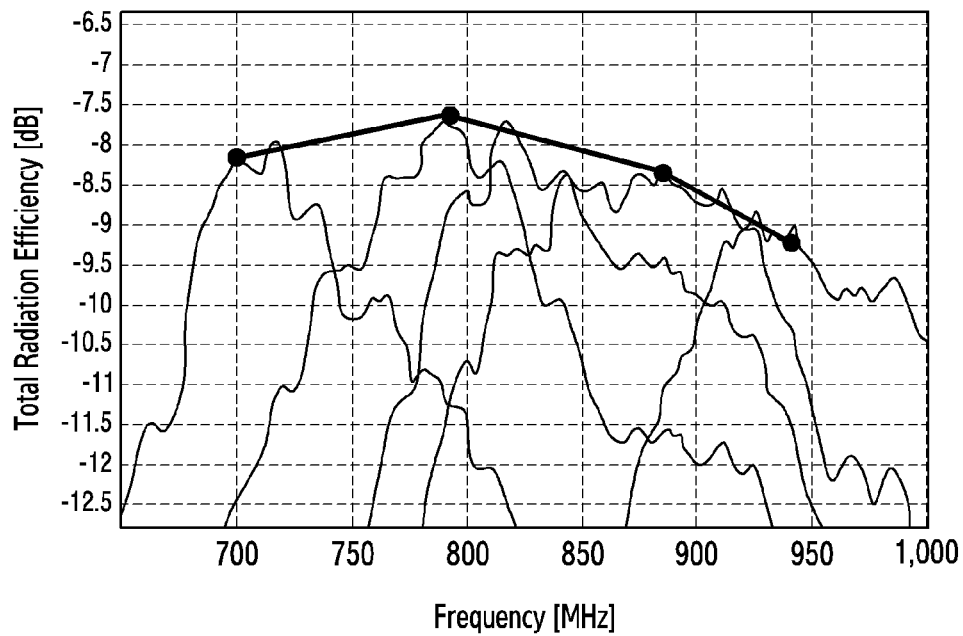
FIG. 14 is a graph showing radiation efficiency of an antenna operating in the state shown in FIG. 10 and an antenna operating in the state shown in FIG. 11.
Figure 14:
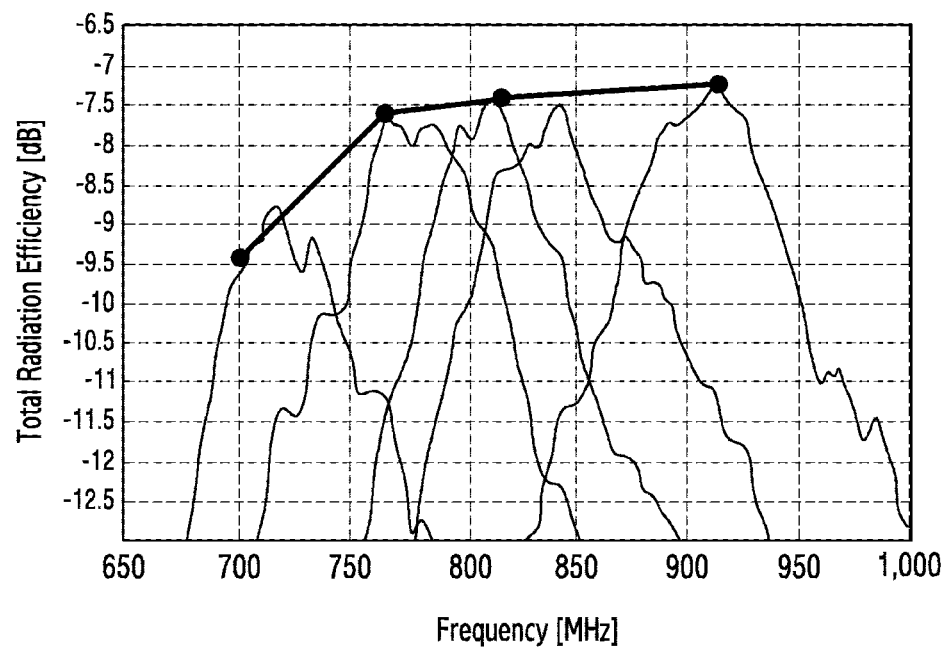

FIG. 14 is a graph showing radiation efficiency of an antenna operating in the state shown in FIG. 10 and an antenna operating in the state shown in FIG. 11. Case (a) of FIG. 14 exemplarily illustrates a measured radiation efficiency while shifting a resonant frequency (e.g., using a tunable element) with respect to the antenna operating in the state shown in FIG. 10. Case (b) of FIG. 4 exemplarily illustrates a measured radiation efficiency while shifting a resonant frequency with respect to an antenna having the structure shown in FIG. 10.

Referring to case (a) of FIG. 14, radiation efficiency gradually deteriorates as the frequency increases in a band exceeding 800 MHz. In addition, referring to case (b) of FIG. 14, for example, good radiation efficiency is exhibited in a frequency band of 800 MHz or higher, and low radiation efficiency is exhibited in a frequency band of 800 MHz or less. As an example, in comparison of cases (a) and (b) of FIG. 14, it may be seen that, in a frequency band of less than 800 MHz, the antenna operating in the state shown in FIG. 10 exhibits relatively good radiation efficiency, and in a frequency band exceeding 800 MHz, the antenna operating in the state shown in FIG. 11 exhibits relatively good radiation efficiency. The antenna operating in the state shown in FIG. 10 and the antenna operating in the state shown in FIG. 11 may have different resonant frequencies producing maximum efficiency. In comparison of cases (a) and (b) of FIG. 14, the antenna operating in the state shown in FIG. 11 appears to have a higher resonant frequency than that of the antenna operating in the state shown in FIG. 10.

According to various embodiments, an antenna structure having improved radiation efficiency in a wide bandwidth may be formed by using the characteristics of the antennas operating in the states of FIGS. 10 and 11.

Figure 15:
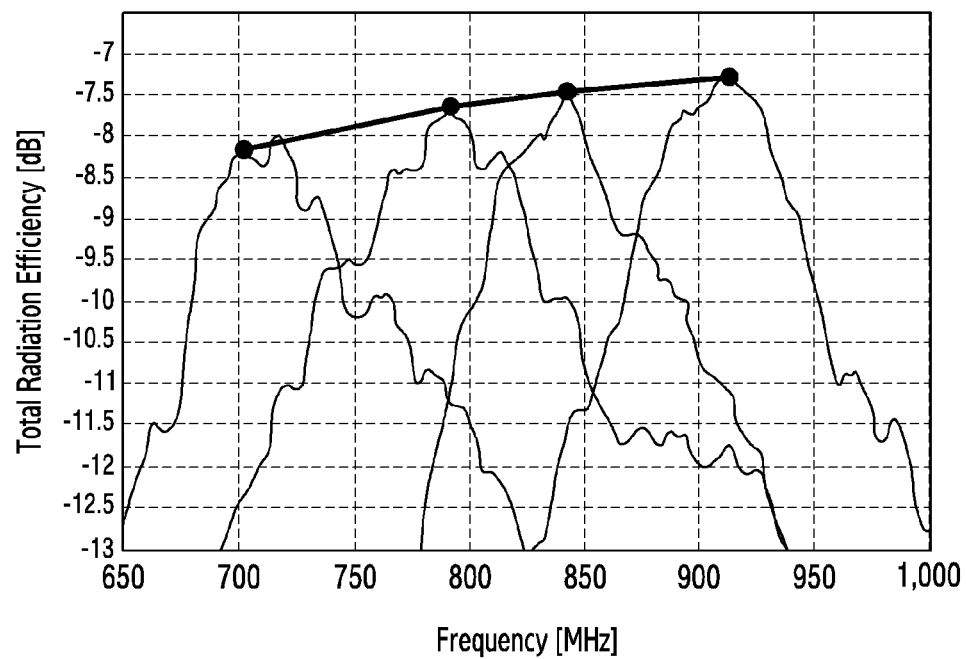
FIG. 15 illustrates radiation efficiency of an antenna structure which operates by switching the state shown in FIG. 10 and the state shown in FIG. 11, according to an embodiment.

FIG. 15 illustrates radiation efficiency in a low frequency band of an antenna which operates by switching the operation state shown in FIG. 10 and the state shown in FIG. 11, according to an embodiment.

An electronic device 100 according to an embodiment operates by switching a connection between the first conductive portion 611 and the second conductive portion 612 according to an operating frequency such that one of the operation states shown in FIGS. 9 to 11 is changed to another state, and thus designated radiation efficiency may be achieved in a wide range of low frequency bands as shown in FIG. 15.

In comparison of case (a) of FIG. 14 and FIG. 15, in case (a) of FIG. 14, radiation efficiency decreases in a band of about 800 MHz or higher, but in FIG. 15, a designated level of radiation efficiency is exhibited even in a band of 800 MHz or higher. For another example, in comparison of case (b) of FIG. 14 and FIG. 15, in case (b) of FIG. 14, radiation efficiency rapidly decreases in a band of less than about 800 MHz, but in FIG. 15, good radiation efficiency is exhibited even in a band of less than 800 MHz.

Figure 16:
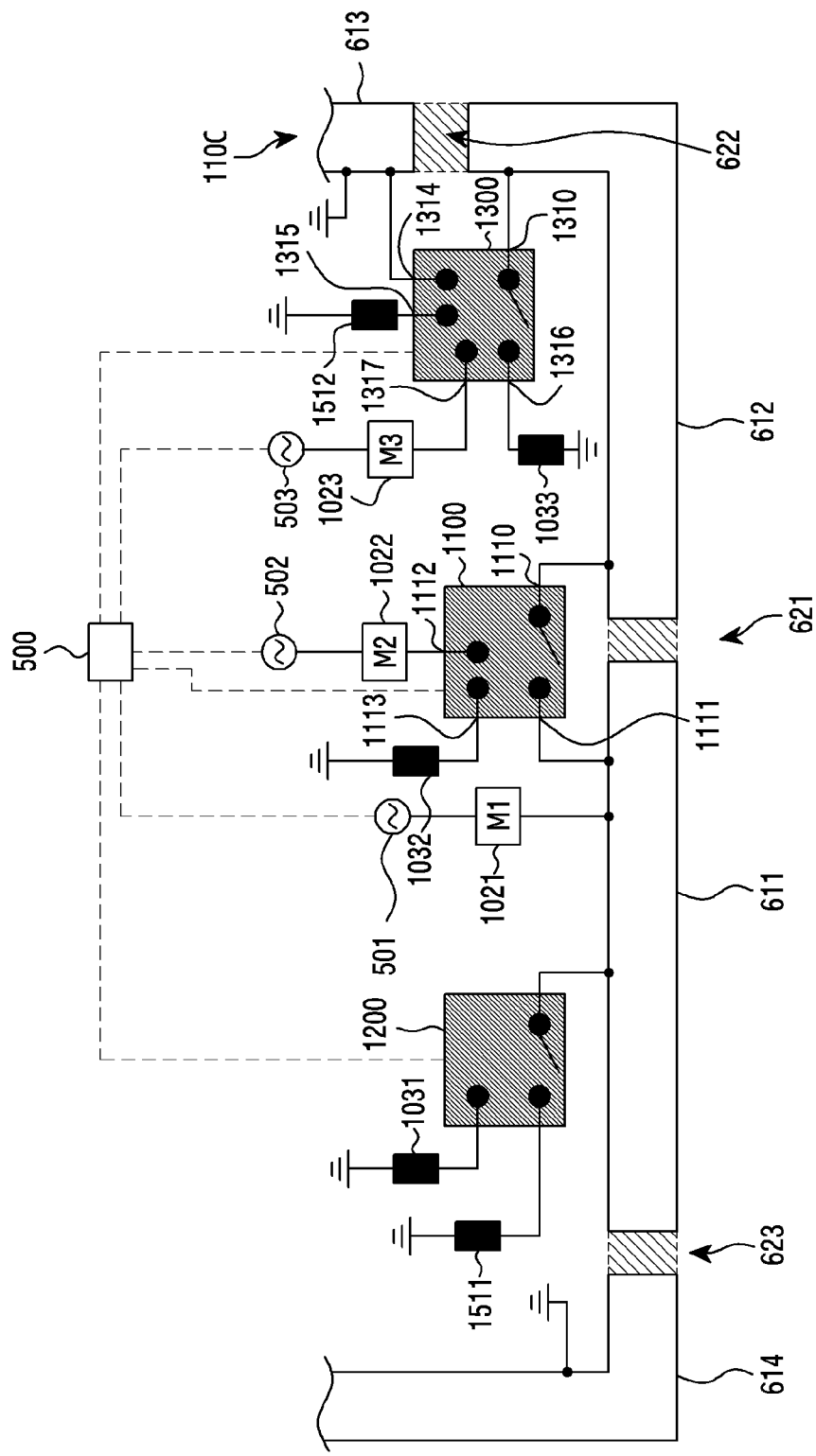
FIG. 16 illustrates a structure of an electronic device for configuring an antenna, according to an embodiment.

FIG. 16 illustrates a structure of an electronic device which configures an antenna by using at least one of three conductive portions 611, 612, and 613, according to an embodiment.

An electronic device 100 according to an embodiment may include the first conductive portion 611, the second conductive portion 612, and/or a third conductive portion 613 segmented and divided through the first non-conductive portion 621 and a third non-conductive portion 622. In an embodiment, the first non-conductive portion 621 or the third non-conductive portion 622 may be filled with a dielectric or configured as an empty space. According to an embodiment, the first conductive portion 611, the second conductive portion 612, and/or the third conductive portion 613 may be configured as a part of the side surface 110C configuring a part of the external appearance of a housing 110 of the electronic device 100, or may be configured as at least a part of the housing inside the housing 110. However, the conductive portion 611, the second conductive portion 612, and/or the third conductive portion 613 are not necessarily required to be configured as a part of the housing 110. According to another embodiment, the first conductive portion 611, the second conductive portion 612, and/or the third conductive portion 613 may be a separate configuration from the housing 110. For example, the conductive portion 611, the second conductive portion 612, and/or the third conductive portion 613 may be conductive patterns disposed inside the housing 110.

According to an embodiment, the electronic device 100 may include a first switch circuit 1100 which connects between the first conductive portion 611 and the second conductive portion 612, a second switch circuit 1200 connected to the first conductive portion 611, and/or a third switch circuit 1300 connected between the second conductive portion 612 and the third conductive portion 613. According to an embodiment, the electronic device 100 may include the first matching part 1021 connected to the first conductive portion 611, the second matching part 1022 connected to the first switch circuit 1100, and/or a third matching part 1023 connected to the third switch circuit 1300. However, the disclosure is not limited thereto. For example, the first matching part 1021 may be omitted and the first feeding circuit 501 may be connected to the first conductive portion 611. For another example, the second matching part 1022 may be omitted and the second feeding circuit 502 may be connected to the second conductive portion 612 through the first switch circuit 1100. For yet another example, the third matching part 1023 may be omitted and a third feeding circuit 503 may be connected to the third conductive portion 613 through the third switch circuit 1300.

According to an embodiment, the first switch circuit 1100 may include the first port 1110, the second port 1111, the third port 1112, and/or the fourth port 1113 substantially the same as the configuration shown in FIG. 10, and may be connected to the first conductive portion 611, the second conductive portion 612, the second matching part 1022, and/or the second matching circuit 1032.

According to an embodiment, the second switch circuit 1200 may connect the first conductive portion 611 to the first matching circuit 1031 or a fourth matching circuit 1511. According to an embodiment, the fourth matching circuit 1511 may include a capacitance element which is electrically grounded. For example, the capacitance element may be configured to have a sufficiently large capacitance value (e.g., 100 pF) to operate as a circuit short-circuited to a ground part with respect to a frequency band of a signal.

According to an embodiment, the third switch circuit 1300 may include a fifth port 1310, a sixth port 1314, and/or a seventh port 1315. According to an embodiment, the fifth port 1310 may be connected to the second conductive portion 622. The sixth port 1314 may be connected to the third conductive portion 613. The seventh port 1315 may be connected to, for example, a fifth matching circuit 1512 configured to include a capacitance element which is grounded. The capacitance element of the fifth matching circuit 1512 may be configured to have, for example, a sufficiently large capacitance value (e.g., 100 pF) to operate as a circuit short-circuited to a ground part with respect to a signal.

According to an embodiment, the third switch circuit 1300 may further include an eighth port 1316 connected to a third matching circuit 1033. The third switch circuit 1300 may further include a ninth port 1317 connected to the third matching part 1023.

Figure 17:
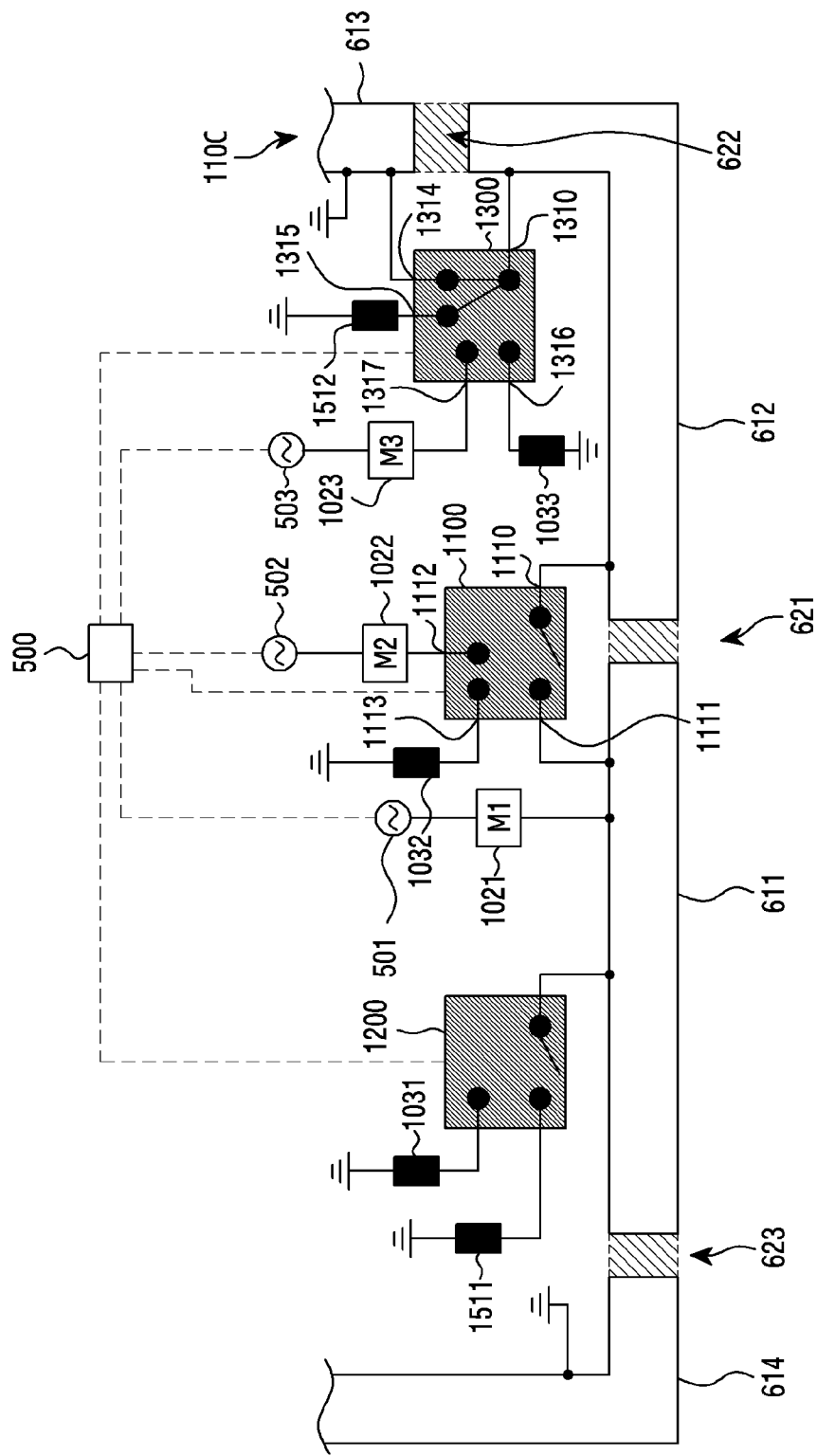
FIG. 17 illustrates an operation state of antennas included in the electronic device shown in FIG. 16, according to an embodiment.

FIG. 17 illustrates an operation state of an antenna included in the electronic device shown in FIG. 16, according to an embodiment.

The electronic device 100 according to an embodiment may include the wireless communication circuit 500 configured to control the first switch circuit 1100, the second switch circuit 1200, and the third switch circuit 1300. According to another embodiment, the first switch circuit 1100, the second switch circuit 1200, and the third switch circuit 1300 may be controlled by a processor separate from the wireless communication circuit 500.

According to an embodiment, when an operating frequency of a signal used for wireless communication is less than a threshold frequency within a designated frequency (e.g., a low frequency) band, the wireless communication circuit 500 may control the first switch circuit 1100, the second switch circuit 1200, and the third switch circuit 1300 such that a structure of an antenna structure substantially operates in a two-segment structure. For example, the wireless communication circuit 500 may control the first switch circuit 1100 such that the first switch circuit 1100 is in an open state or the first port 1110 is connected to the fourth port 1113 connected to a matching circuit (e.g., the matching circuit 1032 of FIG. 16). For another example, the wireless communication circuit 500 may control the second switch circuit 1200 such that the first conductive portion 611 is connected to the matching circuit 1031. The first matching circuit 1031 may be a circuit configured to perform matching with respect to the first conductive portion 611. For another example, the wireless communication circuit 500 may control the third switch circuit 1300 such that the fifth port 1310 is connected to the sixth port 1314 and the seventh port 1315.

As shown in FIG. 17, by controlling the third switch circuit 1300 such that the second conductive portion 612 and the third conductive portion 613 are in a short-circuited state, the electronic device 100 may allow the antenna structure to substantially operate in a two-segment structure. For example, an antenna configured in the operation state shown in FIG. 17 may operate as an antenna having a characteristic similar to that of an antenna configured in the operation state shown in FIG. 9. When the operating frequency is less than the threshold frequency, the electronic device 100 according to an embodiment may transmit a signal fed through the first feeding part 501 through the first conductive portion 611 in the operation state shown in FIG. 17.

Figure 18:
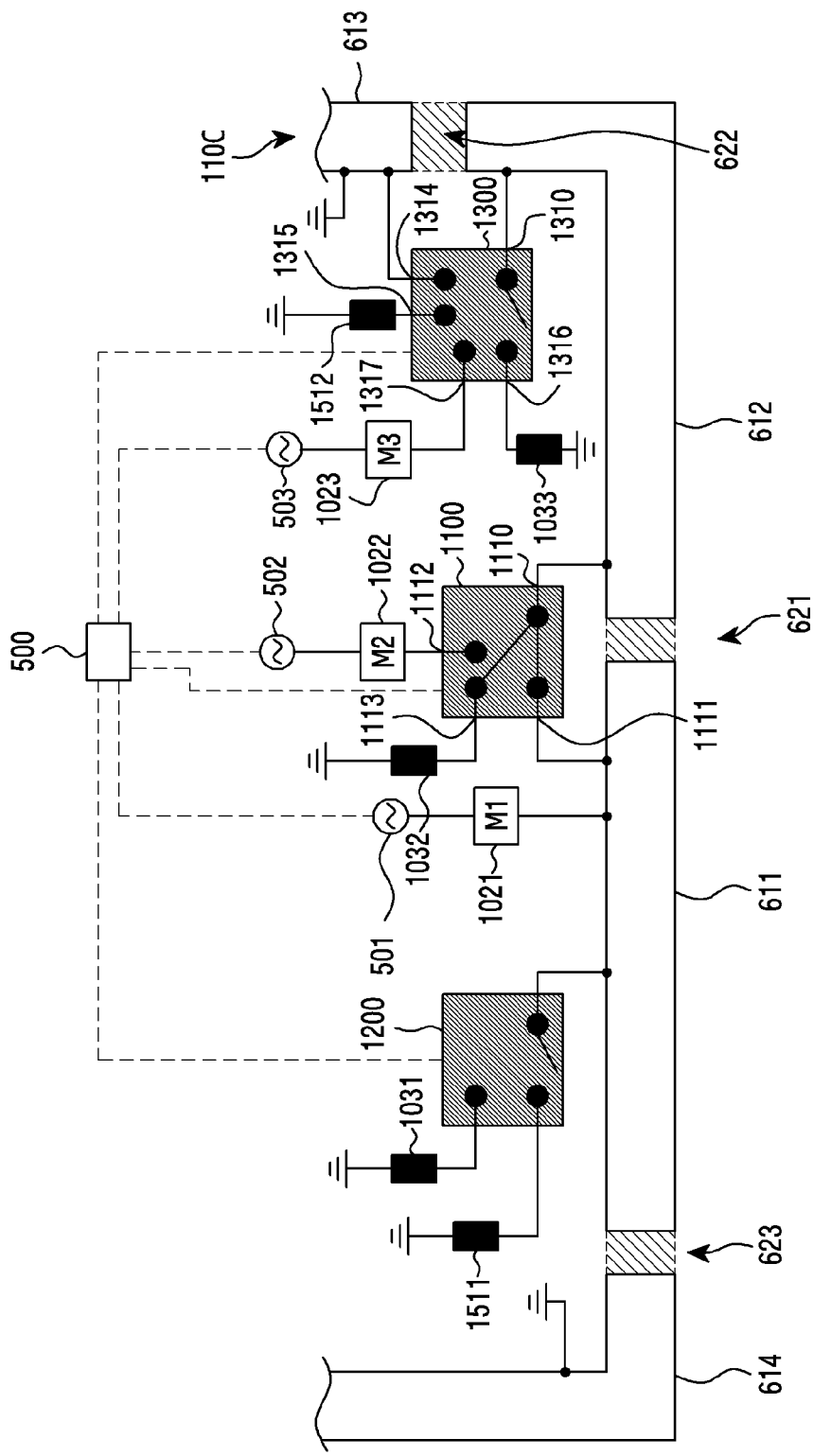
FIG. 18 illustrates an operation state of an antenna included in the electronic device shown in FIG. 16, according to an embodiment.

FIG. 18 illustrates an operation state of antennas included in the electronic device shown in FIG. 16, according to an embodiment.

According to an embodiment, the wireless communication circuit 500 of the electronic device 100 may control the first switch circuit 1100, the second switch circuit 1200, and/or the third switch circuit 1300 such that the first conductive portion 611 and the second conductive portion 612 operate in a two-segment structure in a state of being short-circuited. In an embodiment, when a frequency above a threshold frequency within a low frequency band is an operating frequency, the wireless communication circuit 500 may control the first switch circuit 1100, the second switch circuit 1200, and/or the third switch circuit 1300 so as to be in a connected state as shown in FIG. 18. For example, the wireless communication circuit 500 may control the first switch circuit 1100 such that the first port 1110 is connected to the second port 1111 in order to connect the first conductive portion 611 and the second conductive portion 612. For another example, the wireless communication circuit 500 may control the first switch circuit 1100 such that the first port 1110 is connected to the fourth port 1113 in order to connect the first conductive portion 611 and the second conductive portion 612 to the second matching circuit 1032 with respect to a conductive portion formed by connecting the first conductive portion 611 and the second conductive portion 612. For another example, the wireless communication circuit 500 may control the second switch circuit 1200 so as to be in an open state. For another example, the wireless communication circuit 500 may control the third switch circuit 1300 so as to be in an open state. For example, the fourth matching circuit 1511 may be configured to have a sufficiently large capacitance value (e.g., 100 pF) to operate as a circuit short-circuited to a ground part with respect to a frequency band of a signal.

As shown in FIG. 18, when one side of the first conductive portion 611 is short-circuited by the fourth matching circuit 1511, radiation of a signal in a designated band is made in the third non-conductive portion 622. For example, an antenna configured in the operation state shown in FIG. 18 may operate as an antenna having a characteristic similar to that of an antenna configured in the operation state shown in FIG. 10.

According to another embodiment, the wireless communication circuit 500 may control the first switch circuit 1100 such that the first conductive portion 611 and the second conductive portion 612 are short-circuited according to an operating frequency, and may control the third switch circuit 1300 such that the second conductive portion 612 and the third conductive portion 613 are also short-circuited. In this case, instead of the second matching circuit 1032, a matching circuit for a radiator formed by connecting the first conductive portion 611, the second conductive portion 612, and the third conductive portion 613 may be configured to be connected to the first conductive portion 611, the second conductive portion 612, or the third conductive portion 613.

Figure 19:
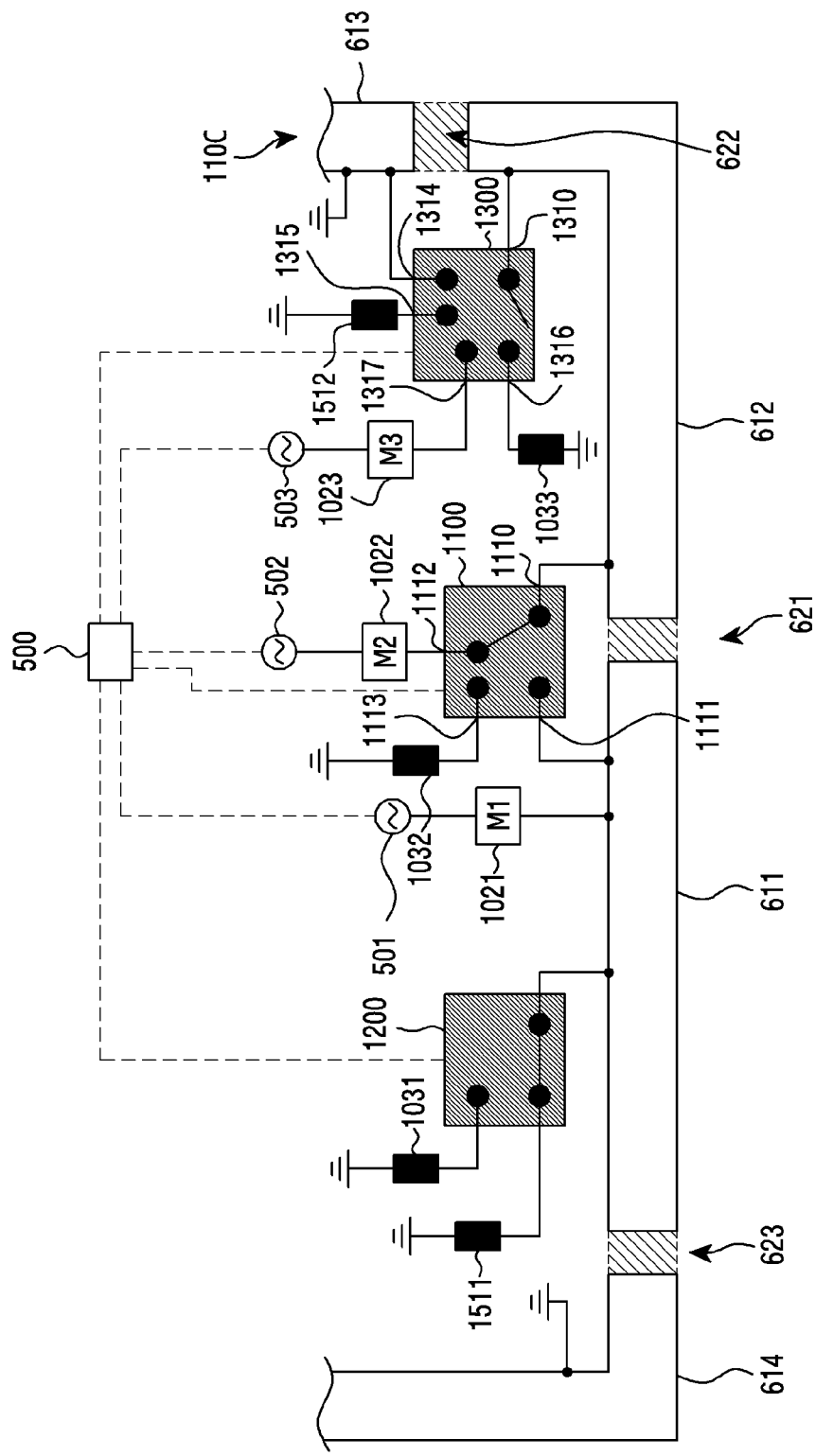
FIG. 19 illustrates an operation state of an antenna included in the electronic device shown in FIG. 16, according to an embodiment.

FIG. 19 illustrates an operation state of an antenna included in the electronic device shown in FIG. 15, according to an embodiment.

According to an embodiment, the wireless communication circuit 500 of the electronic device 100 may control the first switch circuit 1100, the second switch circuit 1200, and/or the third switch circuit 1300 such that a signal fed from the second feeding part 502 may be radiated through the second conductive portion 612.

Referring FIG. 19, in an embodiment, the wireless communication circuit 500 may control the first switch circuit

1100 such that the first port 1110 is connected to the third port 1112 in order to connect the second matching part 1022 to the second conductive portion 612. For example, the wireless communication circuit 500 may control the second switch circuit 1200 such that the first conductive portion 611 is connected to the fourth matching circuit 1511 and short-circuited. For another example, the wireless communication circuit 500 may control the third switch circuit 1300 so as to be opened such that the second conductive portion 612 and the third conductive portion 613 are not connected. According to another embodiment, in order to connect the second conductive portion 612 to the third matching circuit 1033, the wireless communication circuit 500 may control the third switch circuit 1300 such that the fifth port 1310 of the third switch circuit 1300 is connected to the eighth port 1316.

For example, an antenna configured in the operation state shown in FIG. 19 may operate as an antenna having a characteristic similar to that of an antenna configured in the operation state shown in FIG. 11.

According to an embodiment, the electronic device 100 may feed power to the second conductive portion 612 through the second feeding part 502 in the operation state shown in FIG. 19, so as to radiate a wireless signal by using the second conductive portion 612 and the third non-conductive portion 622.

According to another embodiment, the electronic device 100 may control the third switch circuit 1300 such that power is fed from a third feeding part 503 to the second conductive portion 612. The wireless communication circuit 500 may control the third switch circuit 1300 such that the fifth port 1310 of the third switch circuit 1300 is connected to the ninth port 1317, in order to feed power from the third feeding part 503.

Figure 20:
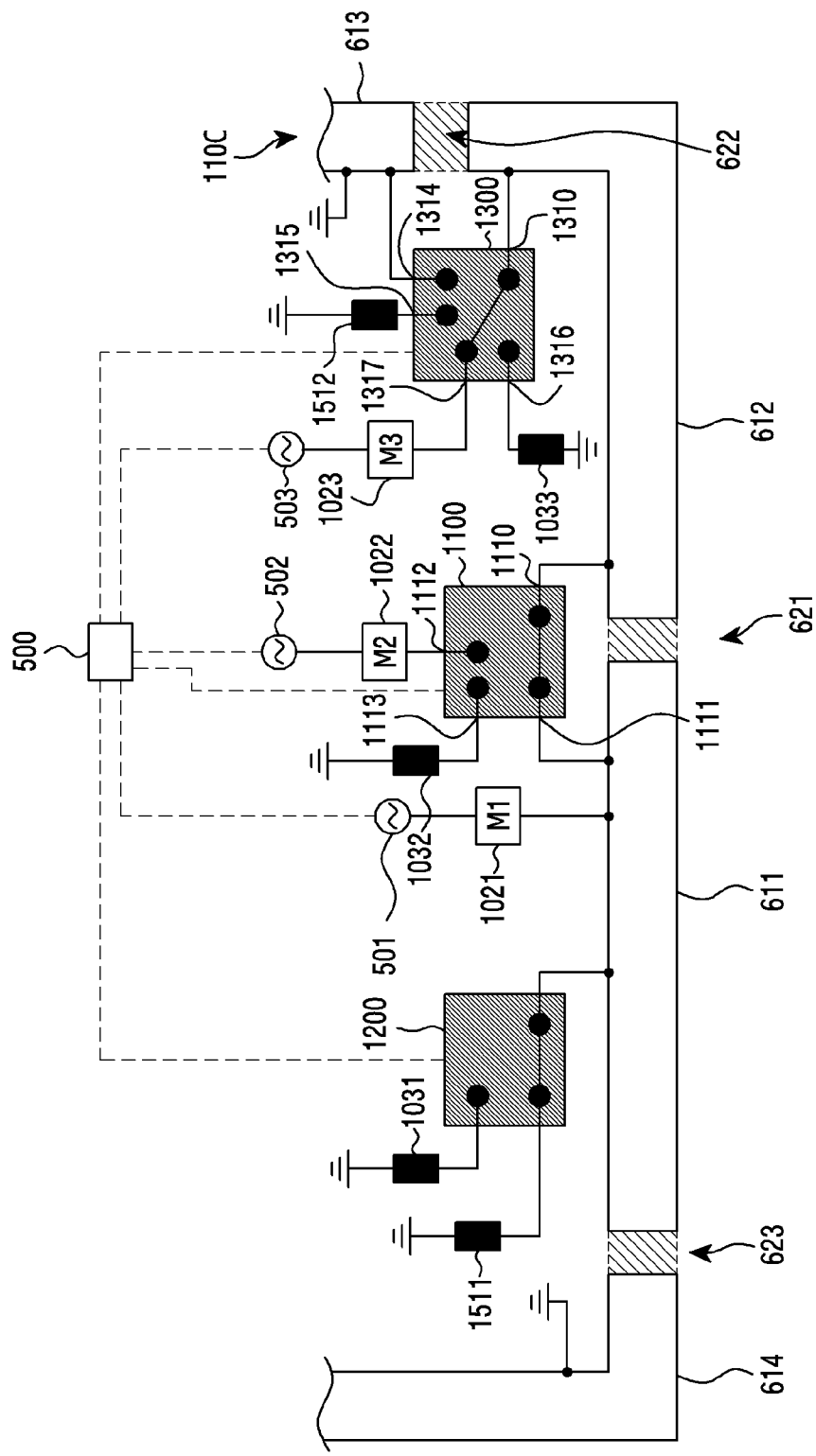
FIG. 20 illustrates an operation state of an antenna included in the electronic device shown in FIG. 16, according to an embodiment.

FIG. 20 illustrates an operation state of an antenna included in the electronic device shown in FIG. 16, according to an embodiment.

According to an embodiment, the wireless communication circuit 500 may control to cause the first switch circuit 1100 to short-circuit the first conductive portion 611 and the second conductive portion 612, and control the second switch circuit 1200 such that the first conductive portion 611 is connected to the fourth matching circuit 1511. The electronic device 100 may cause a signal to be radiated by using the first conductive portion 611, the second conductive portion 612, and the third non-conductive portion 622 in a state in which the first conductive portion 611 and the second conductive portion 612 are short-circuited.

According to an embodiment, the wireless communication circuit 500 may control the third switch circuit 1300 such that the third feeding part 503 is connected to the second conductive portion 612 in order to perform feeding for signal radiation on the second conductive portion 612 or the first conductive portion 611. For example, the wireless communication circuit 500 may control the third switch circuit 1300 such that the fifth port 1310 is connected to the ninth port 1317. Power feeding of the first feeding part 501 and the second feeding part 502 may be inactivated. Therefore, a first antenna and a second antenna may be inactivated, and a third antenna may be disposed using the third feeding part 503, the second conductive portion 612, the first conductive portion 611, and/or the fourth matching circuit 1511.

According to an embodiment, in order to adjust radiation characteristics by the first conductive portion 611 and the second conductive portion 612, the wireless communication circuit 500 may control a switch such that a matching circuit for matching is further connected to the first conductive portion 611 or the second conductive portion 612. For example, the second switch circuit 1200 may selectively connect the first conductive portion 611 to the first matching circuit 1031 or a fourth matching circuit 1522.

Figure 21:
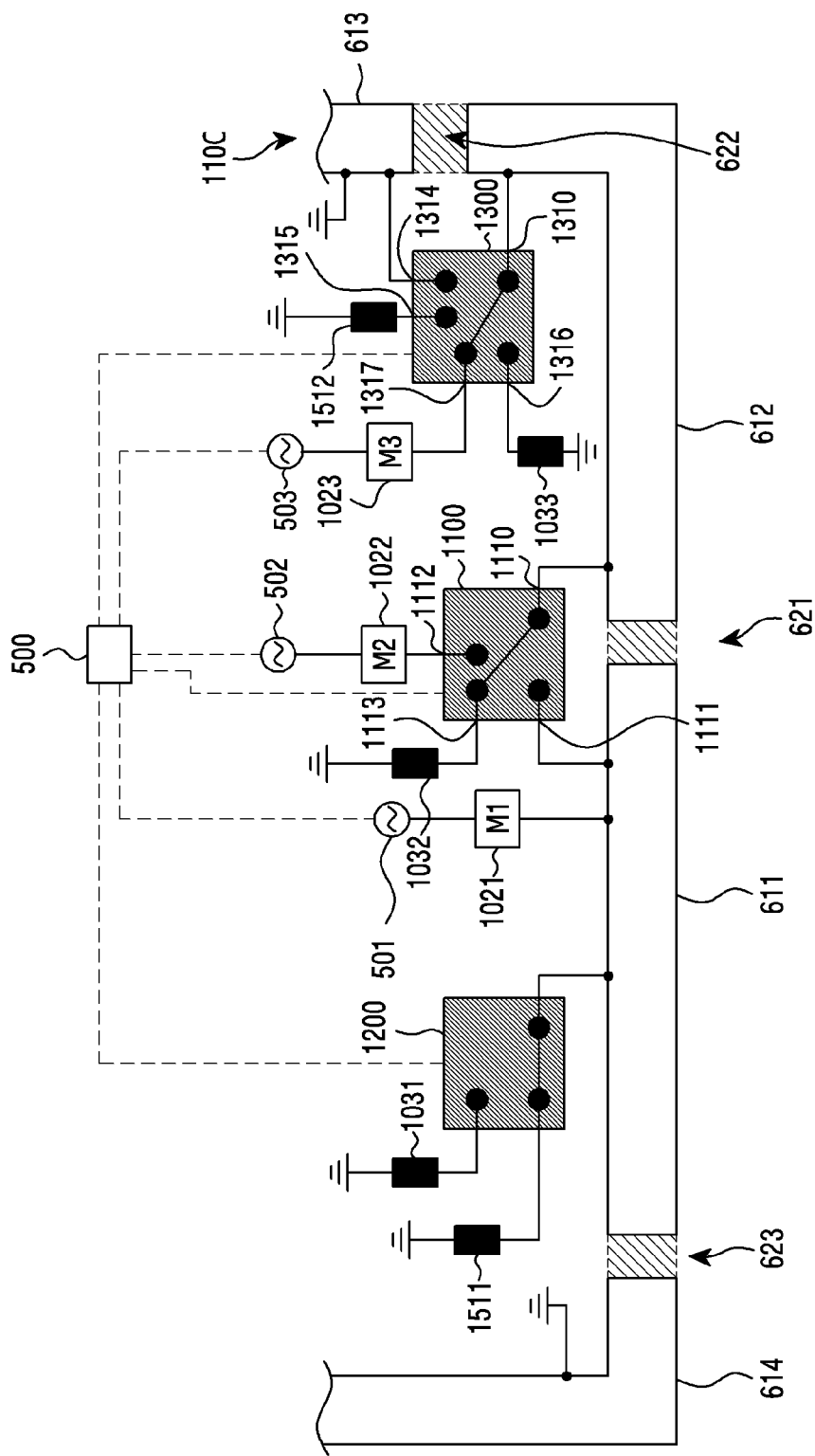
FIG. 21 illustrates an operation state of an antenna included in the electronic device shown in FIG. 16, according to an embodiment.

FIG. 21 illustrates an operation state of an antenna included in the electronic device shown in FIG. 16, according to an embodiment.

According to an embodiment, the wireless communication circuit 500 may control at least one of the switch circuits 1100, 1200, and 1300, so as to radiate a signal by using the second conductive portion 612 in a state in which the second conductive portion 612 is not connected to the first conductive portion 611 and the third conductive portion 613.

Referring to FIG. 21, in an embodiment, the wireless communication circuit 500 may control the first switch circuit 1100 such that the second conductive portion 612 is connected to a matching circuit, and control the second switch circuit 1200 such that the first conductive portion 611 is grounded through the fourth matching circuit 1511. For another example, the wireless communication circuit 500 may control the third switch circuit 1300 such that the third matching part 1023 is connected to the second conductive portion 612. For example, the wireless communication circuit 500 may control the third switch circuit 1300 such that the fifth port 1310 is connected to the ninth port 1317. Power feeding through the first feeding part 501 and the second feeding part 502 may be inactivated. According to another embodiment, power feeding through the first feeding part 501 may be activated to configure an antenna in which the first conductive portion 611 operates as a radiator.

According to an embodiment, in order to adjust radiation characteristics by the first conductive portion 611 and the second conductive portion 612, the wireless communication circuit 500 may control a switch such that a circuit for matching is further connected to the first conductive portion 611 or the second conductive portion 612. For example, the second matching circuit 1032 may be connected through the first switch circuit 1100 or the first switch 1100 may be turned off.

According to an embodiment, an electronic device (e.g., the electronic device 100 of FIGS. 1, 2, and 4, the electronic device 300 of FIG. 3, and the electronic device 1901 of FIG. 22) may include a housing (e.g., the housing 110 of FIG. 1) including a side member (e.g., the side surface 110C of FIG. 1), a wireless communication circuit (e.g., the wireless communication circuit 500 of FIGS. 5 to 11 and the wireless communication circuit 500 of FIGS. 16 to 21) disposed inside the housing 110, and a first switch circuit 1100.

The side member may include a first conductive portion (e.g., the first conductive portion 611 of FIGS. 5 to 11 and the first conductive portion 611 of FIGS. 16 to 21) connected to the wireless communication circuit 500 and the first switch circuit, a second conductive portion (e.g., the second conductive portion 612 of FIGS. 5 to 11 and the second conductive portion 612 of FIGS. 16 to 21) connected to the first switch circuit, and a first non-conductive portion 621 disposed between the first conductive portion and the second conductive portion.

The first switch circuit may be controlled, based on a frequency of a signal transmitted and/or received by the wireless communication circuit 500, so as to be in at least one of a state in which the second conductive portion is connected to the wireless communication circuit 500, a state in which the second conductive portion is connected to the first conductive portion, and an open state.

The electronic device 100 may further include a processor (e.g., the processor 1920 of FIG. 22) disposed inside the housing 110 and connected to the first switch circuit. The wireless communication circuit 500 and/or the processor 1920 may control the first switch circuit.

The first switch circuit (e.g., the first switch 1100 of FIGS. 5 to 11 and the first switch circuit 1100 of FIGS. 16 to 21) may include a first port (e.g., the first port 1110 of FIGS. 5 to 11 and the first port 1110 of FIGS. 16 to 21), a second port (e.g., the second port 1111 of FIGS. 5 to 11 and the second port 1111 of FIGS. 16 to 21), and a third port (e.g., the third port 1112 of FIGS. 5 and 7 to 11 and the third port 1112 of FIGS. 16 to 21). The first port may be connected to at least one of the second port and the third port. The first port may be connected to the second conductive portion, the second port may be connected to the first conductive portion, and the third port may be connected to a second feeding part (e.g., the second feeding part 1022 of FIGS. 5 to 11 and the second feeding part 1022 of FIGS. 16 to 21) configured to feed power to the second conductive portion.

The electronic device 100 may further include a processor (e.g., the processor 1920 of FIG. 22) configured to control a switch circuit (e.g., the first switch 1100 of FIGS. 10 to 13, and the first switch circuit 1100, the second switch circuit 1200, and the third switch circuit 1300 of FIGS. 15 to 18). The wireless communication circuit 500 and/or the processor 1920 may be configured to control the first switch circuit such that the first port is connected to the third port when an operating frequency of a signal fed from a first feeding part is less than a threshold frequency. Alternatively or additionally, the processor 1920 and/or the wireless communication circuit 500 may be configured to control the first switch circuit such that the first port is connected to the second port when the operating frequency is greater than or equal to the threshold frequency.

The first switch circuit may further include a fourth port (e.g., the fourth port 1113 of FIGS. 8 to 11 and the fourth port 1113 of FIGS. 16 to 21), and the first port may be selectively connected to at least one of the second port, the third port, and the third port. Outside the first switch circuit, the fourth port may be connected to a matching circuit (the second matching circuit 1032 of FIGS. 8 to 11 and the second matching circuit 1032 of FIGS. 16 to 21). The matching circuit may be configured to correspond to a resonant frequency value with respect to the first conductive portion. The matching circuit may include a lumped element.

According to an embodiment, the wireless communication circuit 500 and/or the processor 1920 may control the first switch circuit such that the first port is connected to the third port when an operating frequency of a signal fed from the first feeding part is less than a threshold frequency and a signal is fed from the second feeding part. The wireless communication circuit 500 and/or the processor 1920 may control the first switch circuit such that the first port is connected to the second port when the operating frequency of the signal fed from the first feeding part is greater than or equal to the threshold frequency. The wireless communication circuit 500 and/or the processor 1920 may be configured to control the first switch circuit such that the first port is connected to the fourth port when the operating frequency of the signal fed from the first feeding part is less than the threshold frequency and a signal is not fed from the second feeding part. The threshold frequency may be, for example, 800 MHz.

The first feeding part may provide a signal in a low frequency band, and the second feeding part may provide a signal in at least one of a middle frequency band and a high frequency band. According to an embodiment, the first feeding part may be connected to a position in which a distance to one end adjacent to the first non-conductive portion among both ends of the first conductive portion is short.

According to an embodiment, the housing 110 of the electronic device 100 may configure a side surface (e.g., 110C) of the electronic device 100, the side surface including a short surface and a long surface, the first conductive portion may be disposed in a direction of the short surface, and the second conductive portion may be disposed in a direction of the long surface.

The electronic device 100 according to an embodiment may further include a second switch circuit (e.g., the second switch circuit 1200 of FIGS. 16 to 21) configured to connect the first conductive portion to at least one of a matching circuit (e.g., the first matching circuit 1031 of FIGS. 16 to 31) and a matching circuit (e.g., the fourth matching circuit 1511 of FIGS. 16 to 21).

The electronic device 100 according to an embodiment may further include a third conductive portion (e.g., the third conductive portion 613 of FIGS. 16 to 21) and a third switch circuit (e.g., the third switch circuit 1300 of FIGS. 16 to 21). The third conductive portion may be configured as a part of the housing 110, or may be configured as at least a part inside the housing 110. A second non-conductive portion (e.g., the second non-conductive portion 622 of FIGS. 16 to 21) may be disposed between the third conductive portion and the second conductive portion. The third switch circuit may be connected between the second conductive portion and the third conductive portion.

According to an embodiment, the third switch circuit may include a fifth port (e.g., the fifth port 1310 of FIGS. 16 to 21), a sixth port (e.g., the sixth port 1314 of FIGS. 16 to 21), and a seventh port (e.g., the seventh port 1315 of FIGS. 16 to 21). The fifth port may be connected to at least one of the sixth port and the seventh port. Outside the third switch circuit, the fifth port may be connected to the second conductive portion, the sixth port may be connected to the third conductive portion, and the seventh port may be connected to a capacitance element.

The wireless communication circuit 500 and/or the processor 1920 of the electronic device 100 may control the first switch circuit such that the first port is connected to the third port, control the second switch circuit such that the first conductive portion is connected to the matching circuit, and control to cause the first feeding part and the second feeding part to feed power to the first conductive portion and the second conductive portion, in a state in which the third switch circuit is controlled so that the fifth port is connected to the sixth port and the seventh port.

The wireless communication circuit 500 and/or the processor 1920 of the electronic device 100 may control the first switch circuit such that the first port is connected to the second port, and control to cause the first feeding part to feed power to the first conductive portion, in a state in which the second switch circuit is controlled so that the first conductive portion is connected to the capacitance element.

According to an embodiment, the first switch circuit may further include an eighth port (e.g., the eighth port 1316 of FIGS. 15 to 18) connected to a matching circuit. The wireless communication circuit 500 and/or the processor 1920 of the electronic device 100 may control to cause the first feeding part to feed power, in a state in which the first switch circuit is controlled so that the first port is further connected to the eighth port.

According to an embodiment, a matching circuit (e.g., the second matching circuit 1032 of FIGS. 16 to 21) is configured to correspond to a resonant frequency value of a radiator configured by electrically connecting the first conductive portion and the second conductive portion.

The wireless communication circuit 500 and/or the processor 1920 of the electronic device 100 may control the first switch circuit such that the first port is connected to the third port, control the second switch circuit such that the first conductive portion is connected to the capacitance element, and control to cause the second feeding part to feed power, in a state in which the third switch circuit is controlled so that the fifth port is opened.

According to an embodiment, the third switch circuit may be further connected to a third feeding part (e.g., the third feeding part 1023 of FIGS. 16 to 21).

FIG. 22 is a block diagram illustrating an electronic device 1901 in a network environment 1900 according to various embodiments. Referring to FIG. 22, the electronic device 1901 in the network environment 1900 may communicate with an electronic device 1902 via a first network 1998 (e.g., a short-range wireless communication network), or an electronic device 1904 or a server 1908 via a second network 1999 (e.g., a long-range wireless communication network). According to an embodiment, the electronic device 1901 may communicate with the electronic device 1904 via the server 1908. According to an embodiment, the electronic device 1901 may include a processor 1920, memory 1930, an input device 1950, a sound output device 1955, a display device 1960, an audio module 1970, a sensor module 1976, an interface 1977, a haptic module 1979, a camera module 1980, a power management module 1988, a battery 1989, a communication module 1990, a subscriber identification module (SIM) 1996, or an antenna module 1997. In some embodiments, at least one (e.g., the display device 1960 or the camera module 1980) of the components may be omitted from the electronic device 1901. Alternatively or additionally, one or more other components may be added in the electronic device 1901. In some embodiments, some of the components may be implemented as single integrated circuitry. For example, the sensor module 1976 (e.g., a fingerprint sensor, an iris sensor, or an illuminance sensor) may be implemented as embedded in the display device 1960 (e.g., a display).

The processor 1920 may execute, for example, software (e.g., a program 1940) to control at least one other component (e.g., a hardware or software component) of the electronic device 1901 coupled with the processor 1920, and may perform various data processing or computation. According to one embodiment, as at least part of the data processing or computation, the processor 1920 may load a command or data received from another component (e.g., the sensor module 1976 or the communication module 1990) in volatile memory 1932, process the command or the data stored in the volatile memory 1932, and store resulting data in non-volatile memory 1934. According to an embodiment, the processor 1920 may include a main processor 1921 (e.g., a central processing unit (CPU) or an application processor (AP)), and an auxiliary processor 1923 (e.g., a graphics processing unit (GPU), an image signal processor (ISP), a sensor hub processor, or a communication processor (CP)) that is operable independently from, or in conjunction with, the main processor 1921. Additionally or alternatively, the auxiliary processor 1923 may be adapted to consume less power than the main processor 1921, or to be specific to a specified function. The auxiliary processor 1923 may be implemented as separate from, or as part of the main processor 1921.

The auxiliary processor 1923 may control at least some of functions or states related to at least one component (e.g., the display device 1960, the sensor module 1976, or the communication module 1990) among the components of the electronic device 1901, instead of the main processor 1921 while the main processor 1921 is in an inactive (e.g., sleep) state, or together with the main processor 1921 while the main processor 1921 is in an active state (e.g., executing an application). According to an embodiment, the auxiliary processor 1923 (e.g., an image signal processor or a communication processor) may be implemented as part of another component (e.g., the camera module 1980 or the communication module 1990) functionally related to the auxiliary processor 1923.

The memory 1930 may store various data used by at least one component (e.g., the processor 1920 or the sensor module 1976) of the electronic device 1901. The various data may include, for example, software (e.g., the program 1940) and input data or output data for a command related thereto. The memory 1930 may include the volatile memory 1932 or the non-volatile memory 1934.

The program 1940 may be stored in the memory 1930 as software, and may include, for example, an operating system (OS) 1942, middleware 1944, or an application 1946.

The input device 1950 may receive a command or data to be used by other component (e.g., the processor 1920) of the electronic device 1901, from the outside (e.g., a user) of the electronic device 1901. The input device 1950 may include, for example, a microphone, a mouse, a keyboard, or a digital pen (e.g., a stylus pen).

The sound output device 1955 may output sound signals to the outside of the electronic device 1901. The sound output device 1955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1960 may visually provide information to the outside (e.g., a user) of the electronic device 1901. The display device 1960 may include, for example, a display, a hologram device, or a projector and control circuitry to control a corresponding one of the display, hologram device, and projector. According to an embodiment, the display device 1960 may include touch circuitry adapted to detect a touch, or sensor circuitry (e.g., a pressure sensor) adapted to measure the intensity of force incurred by the touch.

The audio module 1970 may convert a sound into an electrical signal and vice versa. According to an embodiment, the audio module 1970 may obtain the sound via the input device 1950, or output the sound via the sound output device 1955 or a headphone of an external electronic device (e.g., an electronic device 1902) directly (e.g., wired) or wirelessly coupled with the electronic device 1901.

The sensor module 1976 may detect an operational state (e.g., power or temperature) of the electronic device 1901 or an environmental state (e.g., a state of a user) external to the electronic device 1901, and then generate an electrical signal or data value corresponding to the detected state. According to an embodiment, the sensor module 1976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1977 may support one or more specified protocols to be used for the electronic device 1901 to be coupled with the external electronic device (e.g., the electronic device 1902) directly (e.g., wired) or wirelessly. According to an embodiment, the interface 1977 may include, for example, a high definition multimedia interface (HDMI), a universal serial bus (USB) interface, a secure digital (SD) card interface, or an audio interface.

A connecting terminal 1978 may include a connector via which the electronic device 1901 may be physically connected with the external electronic device (e.g., the electronic device 1902). According to an embodiment, the connecting terminal 1978 may include, for example, a HDMI connector, a USB connector, a SD card connector, or an audio connector (e.g., a headphone connector).

The haptic module 1979 may convert an electrical signal into a mechanical stimulus (e.g., a vibration or a movement) or electrical stimulus which may be recognized by a user via his tactile sensation or kinesthetic sensation. According to an embodiment, the haptic module 1979 may include, for example, a motor, a piezoelectric element, or an electric stimulator.

The camera module 1980 may capture a still image or moving images. According to an embodiment, the camera module 1980 may include one or more lenses, image sensors, image signal processors, or flashes.

The power management module 1988 may manage power supplied to the electronic device 1901. According to one embodiment, the power management module 1988 may be implemented as at least part of, for example, a power management integrated circuit (PMIC).

The battery 1989 may supply power to at least one component of the electronic device 1901. According to an embodiment, the battery 1989 may include, for example, a primary cell which is not rechargeable, a secondary cell which is rechargeable, or a fuel cell.

The communication module 1990 may support establishing a direct (e.g., wired) communication channel or a wireless communication channel between the electronic device 1901 and the external electronic device (e.g., the electronic device 1902, the electronic device 1904, or the server 1908) and performing communication via the established communication channel. The communication module 1990 may include one or more communication processors that are operable independently from the processor 1920 (e.g., the application processor (AP)) and supports a direct (e.g., wired) communication or a wireless communication. According to an embodiment, the communication module 1990 may include a wireless communication module 1992 (e.g., a cellular communication module, a short-range wireless communication module, or a global navigation satellite system (GNSS) communication module) or a wired communication module 1994 (e.g., a local area network (LAN) communication module or a power line communication (PLC) module). A corresponding one of these communication modules may communicate with the external electronic device via the first network 1998 (e.g., a short-range communication network, such as Bluetooth™, wireless-fidelity (Wi-Fi) direct, or infrared data association (IrDA)) or the second network 1999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1992 may identify and authenticate the electronic device 1901 in a communication network, such as the first network 1998 or the second network 1999, using subscriber information (e.g., international mobile subscriber identity (IMSI)) stored in the subscriber identification module 1996.

The antenna module 1997 may transmit or receive a signal or power to or from the outside (e.g., the external electronic device) of the electronic device 1901. According to an embodiment, the antenna module 1997 may include an antenna including a radiating element composed of a conductive material or a conductive pattern formed in or on a substrate (e.g., PCB). According to an embodiment, the antenna module 1997 may include a plurality of antennas. In such a case, at least one antenna appropriate for a communication scheme used in the communication network, such as the first network 1998 or the second network 1999, may be selected, for example, by the communication module 1990 (e.g., the wireless communication module 1992) from the plurality of antennas. The signal or the power may then be transmitted or received between the communication module 1990 and the external electronic device via the selected at least one antenna. According to an embodiment, another component (e.g., a radio frequency integrated circuit (RFIC)) other than the radiating element may be additionally formed as part of the antenna module 1997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1901 and the external electronic device 1904 via the server 1908 coupled with the second network 1999. Each of the external electronic devices 1902 and 1904 may be a device of a same type as, or a different type, from the electronic device 1901. According to an embodiment, all or some of operations to be executed at the electronic device 1901 may be executed at one or more of the external electronic devices 1902, 1904, or 1908. For example, if the electronic device 1901 should perform a function or a service automatically, or in response to a request from a user or another device, the electronic device 1901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1901. The electronic device 1901 may provide the outcome, with or without further processing of the outcome, as at least part of a reply to the request. To that end, a cloud computing, distributed computing, or client-server computing technology may be used, for example.

The electronic device 100 according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment.

What is claimed is:

1. An electronic device comprising:
a housing comprising a side surface member;
a wireless communication circuit disposed inside the housing; and
a first switch circuit,
wherein the side surface member comprises:
a first conductive portion coupled to the wireless communication circuit and the first switch circuit;
a second conductive portion coupled to the first switch circuit; and
a first non-conductive portion disposed between the first conductive portion and the second conductive portion,
wherein the first switch circuit is configured to be controlled to be in at least one of a first state, a second state, and a third state, based on a first frequency of a first operating signal supplied by the wireless communication circuit,
wherein, in the first state, the first switch circuit is configured to couple the second conductive portion to the wireless communication circuit,
wherein, in the second state, the first switch circuit is configured to couple the second conductive portion to the first conductive portion, and
wherein the third state is an open state.

2. The electronic device of claim 1, wherein the first switch circuit comprises:
a first port that is coupled to the second conductive portion;
a second port that is coupled to the first conductive portion; and
a third port that is coupled to a second feeding part configured to feed power to the second conductive portion,
wherein, in the first state, the first switch circuit is configured to couple the first port to the second port,
wherein, in the second state, the first switch circuit is configured to couple the first port to the third port, and
wherein, in the third state, the first switch circuit is configured to uncouple the first port, the second port, and the third port.

3. The electronic device of claim 2, further comprising a processor configured to control the first switch circuit,
wherein the processor or the wireless communication circuit is configured to:
control the first switch circuit to couple the first port to the third port, when the first frequency of the first operating signal supplied from a first feeding part to the first conductive portion is less than a threshold frequency, and
control the first switch circuit to couple the first port to the second port, when the first frequency of the first operating signal is greater than or equal to the threshold frequency.

4. The electronic device of claim 3, wherein the first switch circuit further comprises a fourth port that is coupled to a matching circuit, and the first switch circuit is further to be controlled to be in a fourth state in which the first port is coupled to the fourth port.

5. The electronic device of claim 4, wherein the processor or the wireless communication circuit is further configured to:
control the first switch circuit to couple the first port to the third port, when the first frequency of the first operating signal fed is less than the threshold frequency and a second operating signal is fed from the second feeding part,
control the first switch circuit to couple the first port to the second port, when the first frequency of the first operating signal fed is greater than or equal to the threshold frequency, and
control the first switch circuit to couple the first port to the fourth port, when the first frequency of the first operating signal fed is less than the threshold frequency and a signal is not fed from the second feeding part.

6. The electronic device of claim 2, wherein the wireless communication circuit is configured to:
provide the first operating signal in a low frequency band through a first feeding part configured to feed first power to the first conductive portion, and
provide a second operating signal in at least one of a middle frequency band and a high frequency band through the second feeding part.

7. The electronic device of claim 1, further comprising a feeding point configured to feed first power to the first conductive portion through a first feeding part, wherein the feeding point is coupled to the first conductive portion at a position where a first distance between the position and a first end of the first conductive portion adjacent to the first non-conductive portion is shorter than a second distance between the position and an opposite end of the first conductive portion.

8. The electronic device of claim 1, wherein the side surface member further comprises a short surface and a long surface, and
the first conductive portion is disposed in a direction of the short surface, and the second conductive portion is disposed in a direction of the long surface.

9. The electronic device of claim 1, further comprising a second switch circuit configured to connect the first conductive portion to at least one of a matching circuit and a capacitance element.

10. The electronic device of claim 9, further comprising:
a third conductive portion configured as a part of the housing or configured as at least a part inside the housing, and electrically spaced apart from the second conductive portion by a second non-conductive portion; and
a third switch circuit connected to the second conductive portion and the third conductive portion.

11. The electronic device of claim 10, wherein the first switch circuit comprises a first port, a second port, and a third port,
the first port is connected to the second conductive portion, the second port is connected to the first conductive portion, and the third port is connected to a second feeding part configured to feed power to the second conductive portion,
the third switch circuit comprises a sixth port and a seventh port, and a fifth port connected to at least one of the sixth port and the seventh port,
the fifth port is connected to the second conductive portion,
the sixth port is connected to the third conductive portion, and
the seventh port is connected to the capacitance element.

12. The electronic device of claim 11, wherein the electronic device further comprises a processor and a first feeding part configured to feed power to the first conductive portion, and
the processor or the wireless communication circuit is configured to:
control the first switch circuit to couple the first port to the third port,
control the second switch circuit to couple the first conductive portion to the matching circuit, and
control the first feeding part and the second feeding part to feed power, when the third switch circuit is controlled to couple the fifth port to the sixth port and to the seventh port.

13. The electronic device of claim 11, wherein the electronic device further comprises a processor and a first feeding part configured to feed power to the first conductive portion, and
the processor or the wireless communication circuit is configured to:
control the first switch circuit to couple the first port to the second port, and
control the first feeding part to feed the power, when the second switch circuit is controlled to couple the first conductive portion to the capacitance element.

14. The electronic device of claim 13, wherein the first switch circuit further comprises an eighth port connected to the matching circuit, and
the processor or the wireless communication circuit is configured to:
control the first feeding part to feed the power, when the first switch circuit is controlled to further couple the first port to the eighth port.

15. The electronic device of claim 11, wherein the electronic device further comprises a processor and the second feeding part, and
the processor or the wireless communication circuit is configured to:
control the first switch circuit to couple the first port to the third port,
control the second switch circuit to couple the first conductive portion to the capacitance element, and
control the second feeding part to feed the power to the second conductive portion, when the third switch circuit is controlled to open the fifth port.

16. An electronic device comprising:
a housing comprising a side surface member;
a wireless communication circuit disposed inside the housing;
a first switch circuit;
a second switch circuit; and
a third switch circuit,
wherein the side surface member comprises:
a first conductive portion coupled to the wireless communication circuit and the first switch circuit;
a second conductive portion coupled to the first switch circuit;
a first non-conductive portion disposed between the first conductive portion and the second conductive portion; and
a third conductive portion configured that is electrically spaced apart from the second conductive portion by a second non-conductive portion,
wherein the third switch circuit is connected to the second conductive portion and the third conductive portion,
wherein the first switch circuit is controlled to be in at least one of a first state, a second state, and a third state, based on a first frequency of a first operating signal supplied by the wireless communication circuit,
wherein the second switch circuit configured to connect the first conductive portion to at least one of a matching circuit and a capacitance element,
wherein, in the first state, the first switch circuit is configured to couple the second conductive portion to the wireless communication circuit,
wherein, in the second state, the first switch circuit is configured to couple the second conductive portion to the first conductive portion, and
wherein the third state is an open state.

17. The electronic device of claim 16, wherein the first switch circuit comprises a first port, a second port, and a third port,
the first port is connected to the second conductive portion, the second port is connected to the first conductive portion, and the third port is connected to a second feeding part configured to feed second power to the second conductive portion,
the third switch circuit comprises a sixth port and a seventh port, and a fifth port connected to at least one of the sixth port and the seventh port,
the fifth port is connected to the second conductive portion,
the sixth port is connected to the third conductive portion, and
the seventh port is connected to the capacitance element.

18. The electronic device of claim 17, wherein the electronic device further comprises a processor and a first feeding part configured to feed first power to the first conductive portion, and
the processor or the wireless communication circuit is configured to:
control the first switch circuit to couple the first port to the third port,
control the second switch circuit to couple the first conductive portion to the matching circuit, and
control the first feeding part to feed the first power and the second feeding part to feed the second power, when the third switch circuit is controlled to couple the fifth port to the sixth port and to the seventh port.

19. The electronic device of claim 17, wherein the electronic device further comprises a processor and a first feeding part configured to feed first power to the first conductive portion, and
the processor or the wireless communication circuit is configured to:
control the first switch circuit to couple the first port to the second port; and
control the first feeding part to feed the first power, when the second switch circuit is controlled to couple the first conductive portion to the capacitance element.

20. A method of controlling a switch circuit by an electronic device, the method comprising:
controlling the switch circuit to couple a first port of the switch circuit to a third port of the switch circuit, when a frequency of an operating signal is less than a threshold frequency, wherein the first port is coupled to a second conductive portion of the electronic device, wherein the third port is coupled to a second feeding part of the electronic device configured to feed second power to the second conductive portion, and wherein the operating signal is supplied from a first feeding part to a first conductive portion; and controlling the switch circuit to couple the first port to a second port, when the frequency of the operating signal exceeds the threshold frequency, wherein the second port is coupled to the first conductive portion.

* * * * *